(12) United States Patent
Kanemaki et al.

(10) Patent No.: US 12,522,836 B2
(45) Date of Patent: Jan. 13, 2026

(54) NONHUMAN ANIMAL AND USE FOR SAME

(71) Applicants: Inter-University Research Institute Corporation Research Organization of Information and Systems, Tokyo (JP); KAKE EDUCATIONAL INSTITUTION, Okayama (JP)

(72) Inventors: Masato Kanemaki, Mishima (JP); Ken-Ichiro Hayashi, Okayama (JP); Naomi Kitamoto, Mishima (JP); Yumiko Saga, Mishima (JP); Rieko Ajima, Mishima (JP)

(73) Assignees: Inter-University Reseach Institute Corporation Research Organization of Informaton and Systems, Tokyo (JP); KAKE EDUCATIONAL INSTITUTION, Okayama (JP)

( * ) Notice: Subject to any disclaimer, the term of this patent is extended or adjusted under 35 U.S.C. 154(b) by 865 days.

(21) Appl. No.: 17/620,993

(22) PCT Filed: Apr. 30, 2020

(86) PCT No.: PCT/JP2020/018310
§ 371 (c)(1),
(2) Date: Dec. 20, 2021

(87) PCT Pub. No.: WO2021/009993
PCT Pub. Date: Jan. 21, 2021

(65) Prior Publication Data
US 2022/0378024 A1    Dec. 1, 2022

(30) Foreign Application Priority Data
Jul. 16, 2019   (JP) .................................. 2019-131464

(51) Int. Cl.
| C12N 15/63 | (2006.01) |
| A01K 67/0275 | (2024.01) |
| C12N 9/10 | (2006.01) |
| C12N 15/90 | (2006.01) |

(52) U.S. Cl.
CPC ........ *C12N 15/635* (2013.01); *A01K 67/0275* (2013.01); *C12N 9/104* (2013.01); *C12N 15/90* (2013.01); *A01K 2217/052* (2013.01); *A01K 2217/203* (2013.01); *A01K 2227/105* (2013.01); *A01K 2267/0393* (2013.01); *C07K 2319/95* (2013.01); *C12N 2310/20* (2017.05)

(58) Field of Classification Search
CPC ...... C12N 15/635; C12N 9/104; C12N 15/90; A01K 67/0275
See application file for complete search history.

(56) References Cited

U.S. PATENT DOCUMENTS

2012/0115232 A1    5/2012   Kanemaki et al.

FOREIGN PATENT DOCUMENTS

| CN | 102676545 A | 9/2012 |
| CN | 114127294 A | 3/2022 |
| JP | A-2008-187958 | 8/2008 |
| WO | WO 2010/125620 A1 | 11/2010 |
| WO | WO 2013/073653 A1 | 5/2013 |
| WO | WO 2017/029833 A1 | 2/2017 |
| WO | WO 2018/164214 A1 | 9/2018 |
| WO | WO 2020/193867 A1 | 10/2020 |

OTHER PUBLICATIONS

Liangyu Zhang, Jordan D. Ward, Ze Cheng and Abby F. Dernburg. The auxin-inducible degradation (AID) system enables versatile conditional protein depletion in C. elegans | Development (2015) 142, 4374-4384 doi: 10.1242/dev.129635 (Year: 2015).*
Zhang L, Ward JD, Cheng Z, Dernburg AF. The auxin-inducible degradation (AID) system enables versatile conditional protein depletion in C. elegans. Development. 2015;142(24):4374-4384. doi: 10.1242/dev.129635 (Year: 2015).*
Link CD. C. elegans models of age-associated neurodegenerative diseases: lessons from transgenic worm models of Alzheimer's disease. Exp Gerontol. 2006;41(10):1007-1013. doi: 10.1016/j.exger.2006.06.059 (Year: 2006).*
Tuite MF. Yeast models of neurodegenerative diseases. Prog Mol Biol Transl Sci. 2019;168:351-379. doi: 10.1016/bs.pmbts.2019.07.001 (Year: 2019).*
Chinese Office Action for Chinese Application No. 202080050921.2 mailed Jul. 18, 2023, 15 pages.
Sima et al., "Advances in primary auxin-responsive Aux/IAA gene family: a review", *Journal of Zhejiang A & F University* 32(2):313-318 (2015).
CAS Registry No. 1368980-27-1, entered STN Apr. 16, 2012.
Chinese Office Action for Application No. 202080050923.1 mailed Jun. 28, 2024, 17 pages.
Bence et al., "Combining the auxin-inducible degradation system with CRISPR/Cas9-based genome editing for the conditional depletion of endogenous *Drosophila melanogaster* proteins", *The FEBS Journal* 284(7):1056-1069 (2017).
Extended European Search Report for EP Application No. 20840241.2, mailed Aug. 9, 2023, 10 pages.
Sequence Search Results (A_Geneseq database, Result 1) (hereinafter "SSR"), (2025).

(Continued)

*Primary Examiner* — Teresa E Knight
*Assistant Examiner* — Kodye Lee Abbott
(74) *Attorney, Agent, or Firm* — Lathrop GPM LLP; Brian C. Trinque; Lisbeth C. Robinson

(57) ABSTRACT

A genetically modified non-human animal in which an auxin-inducible degron system controls degradation of a target protein in a living body includes: a chromosome containing a first nucleic acid that encodes a mutant TIR1 family protein having a mutation at an auxin-binding site and having affinity to an auxin analog.

4 Claims, 13 Drawing Sheets

Specification includes a Sequence Listing.

(56) References Cited

OTHER PUBLICATIONS

U.S. Final Office Action for U.S. Appl. No. 17/620,977 mailed Jun. 12, 2025, 21 pages.
Li et al., "An efficient auxin-inducible degron system with low basal degradation in human cells", *Nature Methods* 16:866-869 (2019).
Sathyan et al., "An improved auxin-inducible degron system preserves native protein levels and enables rapid and specific protein depletion", *Genes & Development* 33:1441-1455 (2019).
U.S. Office Action for U.S. Appl. No. 17/620,977 mailed Jan. 13, 2025, 17 pages.
Haldeman et al., "Creation of versatile cloning platforms for transgene expression and dCas9-based epigenome editing", *Nucleic Acids Research* 47(4):e23 (2019).
Nishimura et al., "An auxin-based degron system for the rapid depletion of proteins in nonplant cells", *Nature Methods*—Methods (2009).
Nishimura et al., "An auxin-based degron system for the rapid depletion of proteins in nonplant cells", *Nature Methods*—Supplementary Figures and Text, pp. 1-21 (2009).
Camlin et al., "Auxin-inducible protein degradation as a novel approach for protein depletion and reverse genetic discoveries in mammalian oocytes", *Biology of Reproduction* 101(4):704-718 (2019).
European Search Report for EP Application No. 20840243.8, mailed May 26, 2023, 11 pages.
Holland et al., "Inducible, reversible system for the rapid and complete degradation of proteins in mammalian cells", *PNAS* 109(49):E3350-E3357 (2012).
Lambrus et al., "Applying the auxin-inducible degradation (AID) system for rapid protein depletion in mammalian cells", bioRxiv (2017), doi: 10.1101/182840, retrieved from the Internet: URL: https://www.biorxiv.org/content/10.1101/182840v1.full.pdf.
Nishimura et al., "An auxin-based degron system for the rapid depletion of proteins in nonplant cells", *Nature Methods* 6(12):917-923 (2009).
Raina et al., "PROTAC-induced BET protein degradation as a therapy for castration-resistant prostate cancer", *PNAS* 113(26):7124-7129 (2016).
Yamada et al., "A Super Strong Engineered Auxin-TIR1 Pair", *Plant and Cell Physiology* 59(8):1538-1544 (2018).
Zhang et al., "AIDing-targeted protein degradation in *Drosophila*", *The FEBS Journal* 284(8):1178-1181 (2017).
Database CHEMCATS, online, Accession No. 0998366508, Mar. 1, 2019.
International Search Report for PCT International Patent Application No., PCT/JP2020/018237, mailed Jul. 14, 2020, with English translation.
International Search Report for PCT International Patent Application No. PCT/JP2020/018310, mailed Jul. 28, 2020, with English translation.
Natsume et al., Rapid Protein Depletion in Human Cells by Auxin-Inducible Degron Tagging with Short Homology Donors, Cell Reports, 2016, vol. 15, pp. 210-218.
Nikkei Business Publications, Inc., Piggybac transposon: Nikkei Biotechnology and Business Online, 2018.
Nishimura et al., An efficient method to generate conditional knockout cell lines for essential genes by combination of auxin-inducible degron tag and CRISPR/Cas9 Chromosome Res, 2017, vol. 25, pp. 253-260.
Uchida et al., Chemical hijacking of auxin signaling with an engineered auxin-TIR1 pair, Nat. Chem. Biol., 2018, vol. 14, No. 3, pp. 299-305.
Uchida et al., Chemical hijacking of auxin signaling with an engineered auxin-TIR1 pair, Nat. Chem. Biol., 2018, vol. 14, No. 3, pp. 299-305, supplementary information, discussion, Figure 1, Supplementary Figure 1.
Yesbolatova et al., Chemical and Genetical Improvement of Auxin-Inducible Degron (AID) technology, Abstract of Annual Meeting of the Molecular Biology Society of Japan, vol. 41, 1P-0747.
Yesbolatova et al., Constructing auxin-inducible degron mutants using an all-in-one vector, Pharmaceuticals, , vol. 13, No. 103, pp. 1-8, 2020.
Yesbolatova et al., Improvement of auxin degron (AID) technology by chemical biology method, Online abstracts of the 42nd annual academic conference of the Molecular Biology Society of Japan, 2019, 3P-0632.

\* cited by examiner

FIG. 6
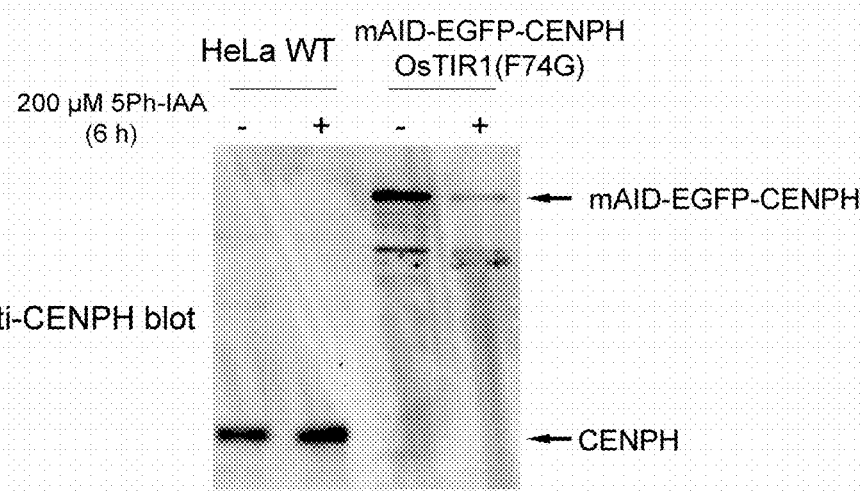
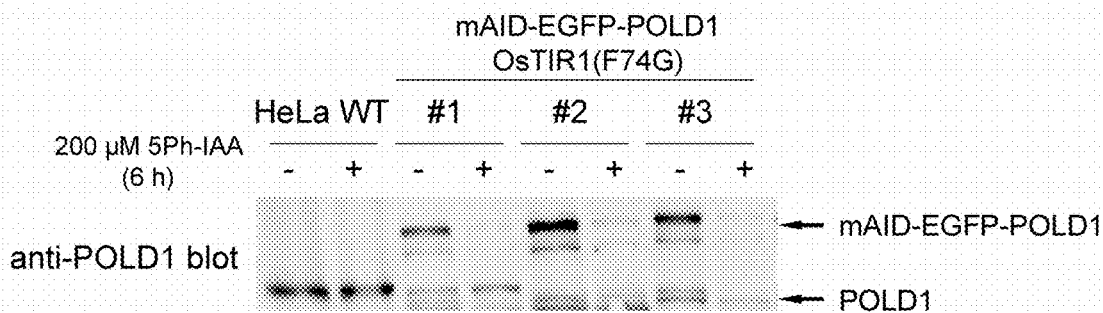

FIG. 9
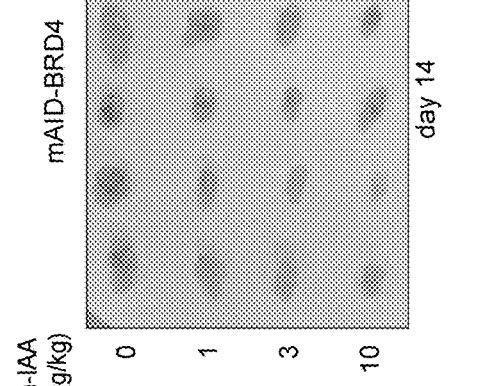
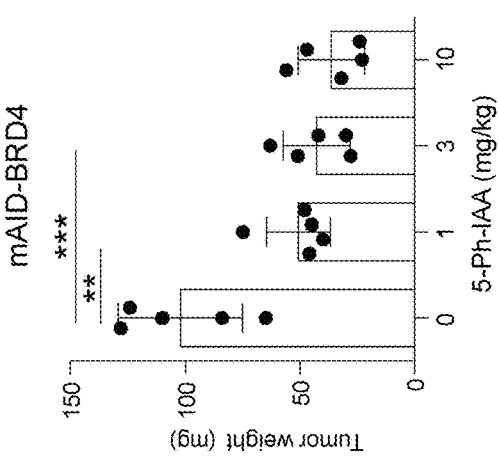
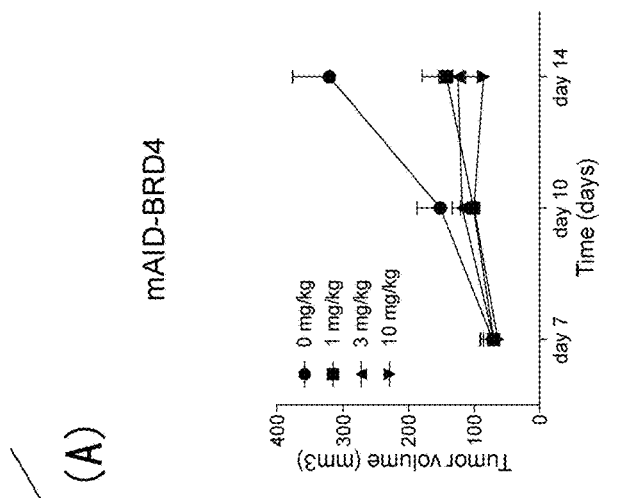

FIG. 10
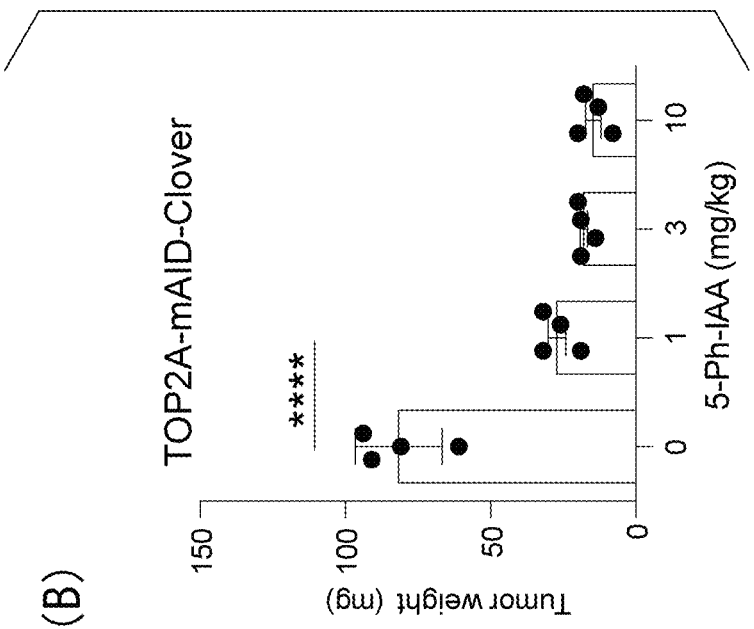
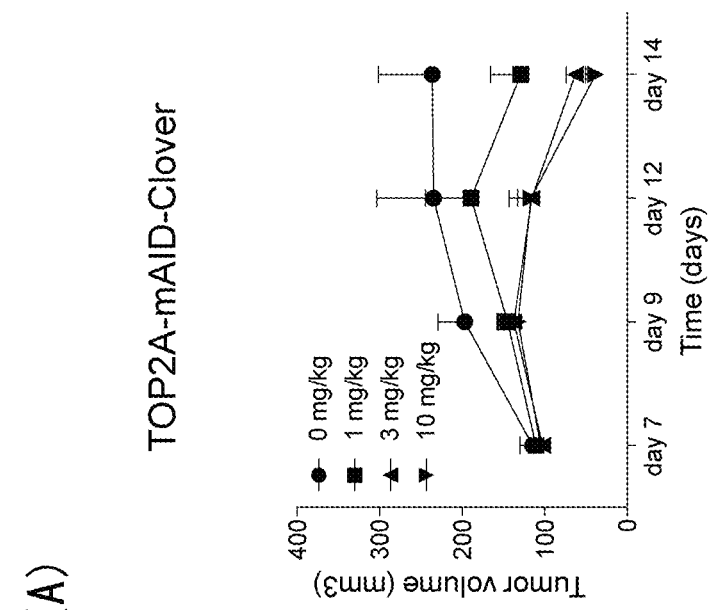

```
                          SEQUENCE LISTING

<160> NUMBER OF SEQ ID NOS: 8

<210> SEQ ID NO 1
<211> LENGTH: 1728
<212> TYPE: DNA
<213> ORGANISM: Oryza sativa

<400> SEQUENCE: 1
atgacgtact tcccggagga ggtggtggag cacatcttca gcttcctgcc ggcgcagcgc      60
gaccgcaaca cggtctcgct cgtctgcaag gtgtggtacg agatcgagag gctgagccgc     120
cgcggcgtct tcgtgggcaa ctgctacgcc gtgcgcgccg gccgcgtcgc cgcgcggttc     180
cccaacgtgc gggcgctcac ggtgaagggg aagccccact tcgccgactt caacctcgtg     240
ccccccgact ggggcggcta cgcggggccg tggatcgagg cggccgcgag gggatgccac     300
ggcctggagg agctcaggat gaagcggatg gtggtgtccg acgagagcct cgagctgctg     360
gctcgctcgt tcccgcggtt cagggctctt gttcttatca gctgcgaggg gttcagcact     420
gacgggctag ccgccgtcgc gagccattgc aagcttctga gggagttgga tttgcaggaa     480
aatgaagtgg aggatcgagg gcctaggtgg ctttcctgct tccctgattc ctgcacatca     540
cttgtctcat tgaattttgc ctgcatcaaa ggggaggtta atgctggttc actggagaga     600
cttgttagca ggtccccaaa cctgcggagt ttgaggctga atcgatctgt atcggtagat     660
acacttgcaa agatactact gcgtacccct aacttggagg atttggggac agggaatttg     720
acagatgact tccaaactga gtcctacttt aagcttacca gtgctctgga gaaatgcaag     780
atgttgagga gttttgtctgg attctgggat gcttctcctg tttgcctgtc atttatctac     840
cccctgtgtg ctcaactgac aggattgaac ttgagctatg cccccacact tgatgcttct     900
gaccttacaa aaatgattag ccgctgtgtg aagctccaac gcctttgggt actggattgt     960
atctcggaca aaggcttgca agtggtggcc tccagttgca agacttgca agaactcagg    1020 gtatttccat cagatttcta cgtagctggt tattctgcag tgacagagga gggacttgtt    1080
gcagtatcct tgggctgtcc aaaactgaac tcactactgt acttctgtca ccaaatgact    1140
aatgctgcac tagttactgt cgccaagaac tgtccaaatt tcacacgatt cagactttgt    1200
attcttgagc cagggaagcc tgatgttgtg acaagccaac cattagatga aggctttgga    1260
gctattgttc gtgagtgcaa gggattacaa cgtttgtcaa tatctggtct tctcacagac    1320
aaagttttca tgtatattgg gaaatatgca aaacaacttg agatgctttc tatagcattt    1380
gctggtgaca gtgataaggg tatgatgcat gttatgaatg gatgcaagaa tttaaggaaa    1440
ctggagataa gagatagccc gtttggtgat gctgcactct tggggaattt tgctaggtac    1500
gagacaatgc gatccctttg gatgtcatct tgcaatgtca cgttaaaggg gtgccaagtc    1560
cttgcgtcaa agatgccgat gctcaatgtt gaggtcataa atgagcggga tggtagcaat    1620
gaaatggagg aaaaccatgg agatctgcct aaagtggaga aattatatgt gtaccgcaca    1680
actgctgggg cgagggatga tgcaccaaat tttgttaaaa tcctatag                 1728

<210> SEQ ID NO 2
<211> LENGTH: 1728
<212> TYPE: DNA
<213> ORGANISM: Artificial Sequence
<220> FEATURE:
```

<223> OTHER INFORMATION: OsTIR1 DNA optimized for human codon

<400> SEQUENCE: 2

```
atgacatact tcctgaaga ggtcgtcgaa cacattttta gcttcctgcc tgcacagaga      60
gatagaaaca cagtgagcct ggtctgcaaa gtgtggtacg agatcgaacg cctgagccgg    120
agaggagtgt tcgtcggcaa ctgctatgct gtgagagcag gcagggtcgc cgctaggttt    180
ccaaatgtgc gcgcactgac cgtcaagggg aaacccccact cgccgactt taacctggtg    240
ccccctgatt ggggaggata cgccggccct tggatcgagg cagccgctcg cggctgtcat    300
ggactggagg aactgcgcat gaagcgaatg gtggtctctg acgaaagtct ggagctgctg    360
gctcggagct ccctaggtt tcgcgcactg gtgctgattt cttgcgaagg cttcagcacc    420
gatggactgg cagccgtggc ctcccactgt aagctgctgc gggagctgga cctccaggag    480
aatgaagtgg aggatagagg ccccagatgg ctgtcttgct cccagactc atgtaccagc    540
ctggtgtccc tgaactttgc ctgcatcaaa ggcgaagtga atgctgggtc cctggagcgg    600
ctggtctcaa gaagcccaa cctgaggtct ctgcggctga accggagcgt gagcgtggac    660
actctggcta agattctgct gagaaccccct aacctggagg atctgggaac cggcaatctg    720
acagacgatt tccagacaga atcctactt aaactgactt ctgccctgga gaagtgtaaa    780
atgctgagga gtctgtcagg attctgggat gcttcacccg tgtgcctgag ctttatctac    840
cctctgtgtg cacagctgac aggcctgaac ctgagctatg caccaaccct ggacgccagt    900
gatctgacaa gatgatctc acgctgcgtg aaactccagc gactgtgggt gctggactgt    960
atttccgata aggggctcca ggtggtcgcc agctcctgca aggacctcca ggagctgaga   1020
gtgttcccat ctgattttta cgtggccgga tatagtgctg tcactgagga aggcctggtg   1080
gcagtctcac tggatgcccc aaagctgaac agcctgctgt atttctgtca tcagatgact   1140
aatgctgcac tggtgaccgt cgccaagaac tgccctaatt tcacccgatt tcggctgtgt   1200
attctggaac caggcaaacc cgacgtggtc acatcccagc cactggatga agggtttgga   1260
gctatcgtga gagagtgcaa gggactccag aggctgagca tttccggcct gctgacagac   1320
aaagtgttca tgtacatcgg caagtatgct aagcagctgg agatgctgag cattgcattt   1380
gccggagact ccgataaggg catgatgcac gtgatgaacg gtgtaagaa tctgcgaaaa   1440
ctggaaatcc gggacagccc tttcggggat gccgctctgc tgggaaactt gccagatac   1500
gagacaatga ggagcctgtg gatgtctagt tgcaatgtga ctctgaaggg ctgtcaggtc   1560
ctggctagta aatgcctat gctgaacgtg gaagtcatta atgagcggga cgggtctaac   1620
gaaatggagg aaaatcatgg cgacctgcca aaggtggaga aactgtatgt gtatcggacc   1680
accgcagggg caagagatga tgctcccaac tttgtgaaga ttctgtga                1728
```

<210> SEQ ID NO 3
<211> LENGTH: 575
<212> TYPE: PRT
<213> ORGANISM: Oryza sativa

<400> SEQUENCE: 3

```
Met Thr Tyr Phe Pro Glu Glu Val Val Glu His Ile Phe Ser Phe Leu
1               5                   10                  15

Pro Ala Gln Arg Asp Arg Asn Thr Val Ser Leu Val Cys Lys Val Trp
            20                  25                  30

Tyr Glu Ile Glu Arg Leu Ser Arg Arg Gly Val Phe Val Gly Asn Cys
        35                  40                  45
```

```
Tyr Ala Val Arg Ala Gly Arg Val Ala Arg Phe Pro Asn Val Arg
    50              55                  60
Ala Leu Thr Val Lys Gly Lys Pro His Phe Ala Asp Phe Asn Leu Val
65                  70                  75                  80
Pro Pro Asp Trp Gly Gly Tyr Ala Gly Pro Trp Ile Glu Ala Ala
                85                  90                  95
Arg Gly Cys His Gly Leu Glu Glu Leu Arg Met Lys Arg Met Val Val
                100                 105                 110
Ser Asp Glu Ser Leu Glu Leu Leu Ala Arg Ser Phe Pro Arg Phe Arg
            115                 120                 125
Ala Leu Val Leu Ile Ser Cys Glu Gly Phe Ser Thr Asp Gly Leu Ala
145                 135                 140
Ala Val Ala Ser His Cys Lys Leu Leu Arg Glu Leu Asp Leu Gln Glu
145                 150                 155                 160
Asn Glu Val Glu Asp Arg Gly Pro Arg Trp Leu Ser Cys Phe Pro Asp
                165                 170                 175
Ser Cys Thr Ser Leu Val Ser Leu Asn Phe Ala Cys Ile Lys Gly Glu
            180                 185                 190
Val Asn Ala Gly Ser Leu Glu Arg Leu Val Ser Arg Ser Pro Asn Leu
    195                 200                 205
Arg Ser Leu Arg Leu Asn Arg Ser Val Ser Val Asp Thr Leu Ala Lys
    210                 215                 220
Ile Leu Leu Arg Thr Pro Asn Leu Glu Asp Leu Gly Thr Gly Asn Leu
225                 230                 235                 240
Thr Asp Asp Phe Gln Thr Glu Ser Tyr Phe Lys Leu Thr Ser Ala Leu
                245                 250                 255
Glu Lys Cys Lys Met Leu Arg Ser Leu Ser Gly Phe Trp Asp Ala Ser
            260                 265                 270
Pro Val Cys Leu Ser Phe Ile Tyr Pro Leu Cys Ala Gln Leu Thr Gly
    275                 280                 285
Leu Asn Leu Ser Tyr Ala Pro Thr Leu Asp Ala Ser Asp Leu Thr Lys
    290                 295                 300
Met Ile Ser Arg Cys Val Lys Leu Gln Arg Leu Trp Val Leu Asp Cys
305                 310                 315                 320
Ile Ser Asp Lys Gly Leu Gln Val Val Ala Ser Ser Cys Lys Asp Leu
                325                 330                 335
Gln Glu Leu Arg Val Phe Pro Ser Asp Phe Tyr Val Ala Gly Tyr Ser
            340                 345                 350
Ala Val Thr Glu Glu Gly Leu Val Ala Val Ser Leu Gly Cys Pro Lys
    355                 360                 365
Leu Asn Ser Leu Leu Tyr Phe Cys His Gln Met Thr Asn Ala Ala Leu
    370                 375                 380
Val Thr Val Ala Lys Asn Cys Pro Asn Phe Thr Arg Phe Arg Leu Cys
385                 390                 395                 400
Ile Leu Glu Pro Gly Lys Pro Asp Val Val Thr Ser Gln Pro Leu Asp
                405                 410                 415
Glu Gly Phe Gly Ala Ile Val Arg Glu Cys Lys Gly Leu Gln Arg Leu
            420                 425                 430
Ser Ile Ser Gly Leu Leu Thr Asp Lys Val Phe Met Tyr Ile Gly Lys
            435                 440                 445
Tyr Ala Lys Gln Leu Glu Met Leu Ser Ile Ala Phe Ala Gly Asp Ser
    450                 455                 460
Asp Lys Gly Met Met His Val Met Asn Gly Cys Lys Asn Leu Arg Lys
```

```
                465                 470                 475                 480
Leu Glu Ile Arg Asp Ser Pro Phe Gly Asp Ala Ala Leu Leu Gly Asn
                    485                 490                 495

Phe Ala Arg Tyr Glu Thr Met Arg Ser Leu Trp Met Ser Ser Cys Asn
                500                 505                 510

Val Thr Leu Lys Gly Cys Gln Val Leu Ala Ser Lys Met Pro Met Leu
                515                 520                 525

Asn Val Glu Val Ile Asn Glu Arg Asp Gly Ser Asn Glu Met Glu Glu
530                 535                 540

Asn His Gly Asp Leu Pro Lys Val Glu Lys Leu Tyr Val Tyr Arg Thr
545                 550                 555                 560

Thr Ala Gly Ala Arg Asp Asp Ala Pro Asn Phe Val Lys Ile Leu
                565                 570                 575

<210> SEQ ID NO 4
<211> LENGTH: 575
<212> TYPE: PRT
<213> ORGANISM: Artificial Sequence
<220> FEATURE:
<223> OTHER INFORMATION: OsTIR1 F74A Protein

<400> SEQUENCE: 4

Met Thr Tyr Phe Pro Glu Glu Val Val Glu His Ile Phe Ser Phe Leu
1               5                   10                  15

Pro Ala Gln Arg Asp Arg Asn Thr Val Ser Leu Val Cys Lys Val Trp
                20                  25                  30

Tyr Glu Ile Glu Arg Leu Ser Arg Arg Gly Val Phe Val Gly Asn Cys
            35                  40                  45

Tyr Ala Val Arg Ala Gly Arg Val Ala Ala Arg Phe Pro Asn Val Arg
        50                  55                  60

Ala Leu Thr Val Lys Gly Lys Pro His Ala Ala Asp Phe Asn Leu Val
65                  70                  75                  80

Pro Pro Asp Trp Gly Gly Tyr Ala Gly Pro Trp Ile Glu Ala Ala Ala
                85                  90                  95

Arg Gly Cys His Gly Leu Glu Glu Leu Arg Met Lys Arg Met Val Val
                100                 105                 110

Ser Asp Glu Ser Leu Glu Leu Leu Ala Arg Ser Phe Pro Arg Phe Arg
            115                 120                 125

Ala Leu Val Leu Ile Ser Cys Glu Gly Phe Ser Thr Asp Gly Leu Ala
        130                 135                 140

Ala Val Ala Ser His Cys Lys Leu Leu Arg Glu Leu Asp Leu Gln Glu
145                 150                 155                 160

Asn Glu Val Glu Asp Arg Gly Pro Arg Trp Leu Ser Cys Phe Pro Asp
                165                 170                 175

Ser Cys Thr Ser Leu Val Ser Leu Asn Phe Ala Cys Ile Lys Gly Glu
            180                 185                 190

Val Asn Ala Gly Ser Leu Glu Arg Leu Val Ser Arg Ser Pro Asn Leu
        195                 200                 205

Arg Ser Leu Arg Leu Asn Arg Ser Val Ser Val Asp Thr Leu Ala Lys
210                 215                 220

Ile Leu Leu Arg Thr Pro Asn Leu Glu Asp Leu Gly Thr Gly Asn Leu
225                 230                 235                 240

Thr Asp Asp Phe Gln Thr Glu Ser Tyr Phe Lys Leu Thr Ser Ala Leu
                245                 250                 255

Glu Lys Cys Lys Met Leu Arg Ser Leu Ser Gly Phe Trp Asp Ala Ser
```

```
            260             265             270
Pro Val Cys Leu Ser Phe Ile Tyr Pro Leu Cys Ala Gln Leu Thr Gly
                275             280             285
Leu Asn Leu Ser Tyr Ala Pro Thr Leu Asp Ala Ser Asp Leu Thr Lys
                290             295             300
Met Ile Ser Arg Cys Val Lys Leu Gln Arg Leu Trp Val Leu Asp Cys
305             310             315             320
Ile Ser Asp Lys Gly Leu Gln Val Val Ala Ser Ser Cys Lys Asp Leu
                325             330             335
Gln Glu Leu Arg Val Phe Pro Ser Asp Phe Tyr Val Ala Gly Tyr Ser
                340             345             350
Ala Val Thr Glu Glu Gly Leu Val Ala Val Ser Leu Gly Cys Pro Lys
                355             360             365
Leu Asn Ser Leu Leu Tyr Phe Cys His Gln Met Thr Asn Ala Ala Leu
                370             375             380
Val Thr Val Ala Lys Asn Cys Pro Asn Phe Thr Arg Phe Arg Leu Cys
385             390             395             400
Ile Leu Glu Pro Gly Lys Pro Asp Val Val Thr Ser Gln Pro Leu Asp
                405             410             415
Glu Gly Phe Gly Ala Ile Val Arg Glu Cys Lys Gly Leu Gln Arg Leu
                420             425             430
Ser Ile Ser Gly Leu Leu Thr Asp Lys Val Phe Met Tyr Ile Gly Lys
                435             440             445
Tyr Ala Lys Gln Leu Glu Met Leu Ser Ile Ala Phe Ala Gly Asp Ser
                450             455             460
Asp Lys Gly Met Met His Val Met Asn Gly Cys Lys Asn Leu Arg Lys
465             470             475             480
Leu Glu Ile Arg Asp Ser Pro Phe Gly Asp Ala Ala Leu Leu Gly Asn
                485             490             495
Phe Ala Arg Tyr Glu Thr Met Arg Ser Leu Trp Met Ser Ser Cys Asn
                500             505             510
Val Thr Leu Lys Gly Cys Gln Val Leu Ala Ser Lys Met Pro Met Leu
                515             520             525
Asn Val Glu Val Ile Asn Glu Arg Asp Gly Ser Asn Glu Met Glu Glu
                530             535             540
Asn His Gly Asp Leu Pro Lys Val Glu Lys Leu Tyr Val Tyr Arg Thr
545             550             555             560
Thr Ala Gly Ala Arg Asp Asp Ala Pro Asn Phe Val Lys Ile Leu
                565             570             575

<210> SEQ ID NO 5
<211> LENGTH: 1728
<212> TYPE: DNA
<213> ORGANISM: Artificial Sequence
<220> FEATURE:
<223> OTHER INFORMATION: OsTIR1 F74A DNA

<400> SEQUENCE: 5
atgacatact ttcctgaaga ggtcgtcgaa cacatttta gcttcctgcc tgcacagaga    60
gatagaaaca cagtgagcct ggtctgcaaa gtgtggtacg agatcgaacg cctgagccgg   120
agaggagtgt cgtcggcaa ctgctatgct gtgagagcag gcagggtcgc cgctaggttt   180
ccaaatgtgc gcgcactgac cgtcaagggg aaaccccacg ccgccgactt taacctggtg   240 cccctgatt ggggaggata cgccggccct tggatcgagg cagccgctcg cggctgtcat   300
```

| | |
|---|---|
| ggactggagg aactgcgcat gaagcgaatg gtggtctctg acgaaagtct ggagctgctg | 360 |
| gctcggagct tccctaggtt tcgcgcactg gtgctgattt cttgcgaagg cttcagcacc | 420 |
| gatggactgg cagccgtggc ctcccactgt aagctgctgc gggagctgga cctccaggag | 480 |
| aatgaagtgg aggatagagg ccccagatgg ctgtcttgct cccagactc atgtaccagc | 540 |
| ctggtgtccc tgaactttgc ctgcatcaaa ggcgaagtga atgctgggtc cctggagcgg | 600 |
| ctggtctcaa gaagcccaa cctgaggtct ctgcggctga accggagcgt gagcgtggac | 660 |
| actctggcta agattctgct gagaaccct aacctggagg atctgggaac cggcaatctg | 720 |
| acagacgatt tccagacaga atcctacttt aaactgactt ctgccctgga gaagtgtaaa | 780 |
| atgctgagga gtctgtcagg attctgggat gcttcacccg tgtgcctgag cttatctac | 840 |
| cctctgtgtg cacagctgac aggcctgaac ctgagctatg caccaaccct ggacgccagt | 900 |
| gatctgacaa agatgatctc acgctgcgtg aaactccagc gactgtgggt gctggactgt | 960 |
| atttccgata aggggctcca ggtggtcgcc agctcctgca aggacctcca ggagctgaga | 1020 |
| gtgttcccat ctgattttta cgtggccgga tatagtgctg tcactgagga aggcctggtg | 1080 |
| gcagtctcac tgggatgccc aaagctgaac agcctgctgt atttctgtca tcagatgact | 1140 |
| aatgctgcac tggtgaccgt cgccaagaac tgccctaatt tcacccgatt tcggctgtgt | 1200 |
| attctggaac caggcaaacc cgacgtggtc acatcccagc cactggatga agggtttgga | 1260 |
| gctatcgtga gagagtgcaa gggactccag aggctgagca tttccggcct gctgacagac | 1320 |
| aaagtgttca tgtacatcgg caagtatgct aagcagctgg agatgctgag cattgcattt | 1380 |
| gccggagact ccgataaggg catgatgcac gtgatgaacg ggtgtaagaa tctgcgaaaa | 1440 |
| ctggaaatcc gggacagccc tttcggggat gccgctctgc tgggaaactt gccagatac | 1500 |
| gagacaatga ggagcctgtg gatgtctagt tgcaatgtga ctctgaaggg ctgtcaggtc | 1560 |
| ctggctagta aaatgcctat gctgaacgtg gaagtcatta atgagcggga cgggtctaac | 1620 |
| gaaatggagg aaaatcatgg cgacctgcca aaggtggaga aactgtatgt gtatcggacc | 1680 |
| accgcagggg caagagatga tgctcccaac tttgtgaaga ttctgtga | 1728 |

<210> SEQ ID NO 6
<211> LENGTH: 575
<212> TYPE: PRT
<213> ORGANISM: Artificial Sequence
<220> FEATURE:
<223> OTHER INFORMATION: OsTIR1 F74G Protein

<400> SEQUENCE: 6

```
Met Thr Tyr Phe Pro Glu Glu Val Val Glu His Ile Phe Ser Phe Leu
1               5                   10                  15

Pro Ala Gln Arg Asp Arg Asn Thr Val Ser Leu Val Cys Lys Val Trp
            20                  25                  30

Tyr Glu Ile Glu Arg Leu Ser Arg Arg Gly Val Phe Val Gly Asn Cys
        35                  40                  45

Tyr Ala Val Arg Ala Gly Arg Val Ala Ala Arg Phe Pro Asn Val Arg
    50                  55                  60

Ala Leu Thr Val Lys Gly Lys Pro His Gly Ala Asp Phe Asn Leu Val
65                  70                  75                  80

Pro Pro Asp Trp Gly Gly Tyr Ala Gly Pro Trp Ile Glu Ala Ala Ala
                85                  90                  95

Arg Gly Cys His Gly Leu Glu Glu Leu Arg Met Lys Arg Met Val Val
            100                 105                 110
```

-continued

```
Ser Asp Glu Ser Leu Glu Leu Leu Ala Arg Ser Phe Pro Arg Phe Arg
            115                 120                 125

Ala Leu Val Leu Ile Ser Cys Glu Gly Phe Ser Thr Asp Gly Leu Ala
130                 135                 140

Ala Val Ala Ser His Cys Lys Leu Leu Arg Glu Leu Asp Leu Gln Glu
145                 150                 155                 160

Asn Glu Val Glu Asp Arg Gly Pro Arg Trp Leu Ser Cys Phe Pro Asp
                165                 170                 175

Ser Cys Thr Ser Leu Val Ser Leu Asn Phe Ala Cys Ile Lys Gly Glu
                180                 185                 190

Val Asn Ala Gly Ser Leu Glu Arg Leu Val Ser Arg Ser Pro Asn Leu
            195                 200                 205

Arg Ser Leu Arg Leu Asn Arg Ser Val Ser Val Asp Thr Leu Ala Lys
210                 215                 220

Ile Leu Leu Arg Thr Pro Asn Leu Glu Asp Leu Gly Thr Gly Asn Leu
225                 230                 235                 240

Thr Asp Asp Phe Gln Thr Glu Ser Tyr Phe Lys Leu Thr Ser Ala Leu
                245                 250                 255

Glu Lys Cys Lys Met Leu Arg Ser Leu Ser Gly Phe Trp Asp Ala Ser
            260                 265                 270

Pro Val Cys Leu Ser Phe Ile Tyr Pro Leu Cys Ala Gln Leu Thr Gly
            275                 280                 285

Leu Asn Leu Ser Tyr Ala Pro Thr Leu Asp Ala Ser Asp Leu Thr Lys
            290                 295                 300

Met Ile Ser Arg Cys Val Lys Leu Gln Arg Leu Trp Val Leu Asp Cys
305                 310                 315                 320

Ile Ser Asp Lys Gly Leu Gln Val Val Ala Ser Ser Cys Lys Asp Leu
                325                 330                 335

Gln Glu Leu Arg Val Phe Pro Ser Asp Phe Tyr Val Ala Gly Tyr Ser
            340                 345                 350

Ala Val Thr Glu Glu Gly Leu Val Ala Val Ser Leu Gly Cys Pro Lys
            355                 360                 365

Leu Asn Ser Leu Leu Tyr Phe Cys His Gln Met Thr Asn Ala Ala Leu
370                 375                 380

Val Thr Val Ala Lys Asn Cys Pro Asn Phe Thr Arg Phe Arg Leu Cys
385                 390                 395                 400

Ile Leu Glu Pro Gly Lys Pro Asp Val Val Thr Ser Gln Pro Leu Asp
                405                 410                 415

Glu Gly Phe Gly Ala Ile Val Arg Glu Cys Lys Gly Leu Gln Arg Leu
            420                 425                 430

Ser Ile Ser Gly Leu Leu Thr Asp Lys Val Phe Met Tyr Ile Gly Lys
            435                 440                 445

Tyr Ala Lys Gln Leu Glu Met Leu Ser Ile Ala Phe Ala Gly Asp Ser
450                 455                 460

Asp Lys Gly Met Met His Val Met Asn Gly Cys Lys Asn Leu Arg Lys
465                 470                 475                 480

Leu Glu Ile Arg Asp Ser Pro Phe Gly Asp Ala Ala Leu Leu Gly Asn
                485                 490                 495

Phe Ala Arg Tyr Glu Thr Met Arg Ser Leu Trp Met Ser Ser Cys Asn
                500                 505                 510

Val Thr Leu Lys Gly Cys Gln Val Leu Ala Ser Lys Met Pro Met Leu
            515                 520                 525

Asn Val Glu Val Ile Asn Glu Arg Asp Gly Ser Asn Glu Met Glu Glu
```

```
              530               535               540
    Asn His Gly Asp Leu Pro Lys Val Glu Lys Leu Tyr Val Tyr Arg Thr
    545               550               555               560

Thr Ala Gly Ala Arg Asp Asp Ala Pro Asn Phe Val Lys Ile Leu
                      565               570               575

<210> SEQ ID NO 7
<211> LENGTH: 1728
<212> TYPE: DNA
<213> ORGANISM: Artificial Sequence
<220> FEATURE:
<223> OTHER INFORMATION: OsTIR1 F74G DNA

<400> SEQUENCE: 7
atgacatact ttcctgaaga ggtcgtcgaa cacattttta gcttcctgcc tgcacagaga      60
gatagaaaca cagtgagcct ggtctgcaaa gtgtggtacg agatcgaacg cctgagccgg     120
agaggagtgt tcgtcggcaa ctgctatgct gtgagagcag gcagggtcgc cgctaggttt     180
ccaaatgtgc gcgcactgac cgtcaagggg aaacccacg gcgccgactt taacctggtg      240
cccctgatt ggggaggata cgccggccct tggatcgagg cagccgctcg cggctgtcat     300
ggactggagg aactgcgcat gaagcgaatg gtggtctctg acgaaagtct ggagctgctg     360
gctcggagct tccctaggtt tcgcgcactg gtgctgattt cttgcgaagg cttcagcacc     420
gatggactgg cagccgtggc ctcccactgt aagctgctgc gggagctgga cctccaggag     480
aatgaagtgg aggatagagg ccccagatgg ctgtcttgct cccagactc atgtaccagc      540
ctggtgtccc tgaactttgc ctgcatcaaa ggcgaagtga atgctgggtc cctggagcgg     600
ctggtctcaa gaagccccaa cctgaggtct ctgcggctga accggagcgt gagcgtggac     660
actctggcta agattctgct gagaacccct aacctgagg atctgggaac cggcaatctg      720
acagacgatt tccagacaga atcctacttt aaactgactt ctgccctgga agtgtaaa       780
atgctgagga gtctgtcagg attctgggat gcttcacccg tgtgcctgag ctttatctac     840
cctctgtgtg cacagctgac aggcctgaac ctgagctatg caccaaccct ggacgccagt     900
gatctgacaa gatgatgatc acgctgcgtg aaactccagc gactgtgggt gctggactgt     960
atttccgata aggggctcca ggtggtcgcc agctcctgca aggacctcca ggagctgaga    1020
gtgttcccat ctgattttta cgtggccgga tatagtgctg tcactgagga aggcctggtg    1080
gcagtctcac tgggatgccc aaagctgaac agcctgctgt atttctgtca tcagatgact    1140
aatgctgcac tggtgaccgt cgccaagaac tgccctaatt tcacccgatt tcggctgtgt    1200
attctggaac caggcaaacc cgacgtggtc acatcccagc cactggatga agggtttgga    1260
gctatcgtga gagagtgcaa gggactccag aggctgagca tttccggcct gctgacagac    1320
aaagtgttca tgtacatcgg caagtatgct aagcagctgg agatgctgag cattgcattt    1380
gccggagact ccgataaggg catgatgcac gtgatgaacg ggtgtaagaa tctgcgaaaa    1440
ctggaaatcc gggacagccc tttcggggat gccgctctgc tgggaaactt gccagatac    1500
gagacaatga ggagcctgtg gatgtctagt tgcaatgtga ctctgaaggg ctgtcaggtc    1560
ctggctagta aaatgcctat gctgaacgtg gaagtcatta tgagcggga cgggtctaac    1620
gaaatggagg aaaatcatgg cgacctgcca aaggtggaga actgtatgt gtatcggacc    1680
accgcagggg caagagatga tgctcccaac tttgtgaaga ttctgtga              1728

<210> SEQ ID NO 8
<211> LENGTH: 68
```

```
<212> TYPE: PRT
<213> ORGANISM: Artificial Sequence
<220> FEATURE:
<223> OTHER INFORMATION: Mini auxin inducible degron

<400> SEQUENCE: 8

Lys Glu Lys Ser Ala Cys Pro Lys Asp Pro Ala Lys Pro Pro Ala Lys
1               5                   10                  15

Ala Gln Val Val Gly Trp Pro Pro Val Arg Ser Tyr Arg Lys Asn Val
            20                  25                  30

Met Val Ser Cys Gln Lys Ser Ser Gly Gly Pro Glu Ala Ala Ala Phe
            35                  40                  45

Val Lys Val Ser Met Asp Gly Ala Pro Tyr Leu Arg Lys Ile Asp Leu
    50                  55                  60

Arg Met Tyr Lys
65
```

NONHUMAN ANIMAL AND USE FOR SAME

TECHNICAL FIELD

The present invention relates to a non-human animal, a method for analyzing a function of a target protein, and a method for evaluating a drug discovery target protein or a drug.

Priority is claimed on Japanese Patent Application No. 2019-131464, filed in Japan on Jul. 16, 2019, the content of which is incorporated herein by reference.

BACKGROUND ART

The present inventors have thus far developed a protein degradation control technology called an auxin-inducible degron system (for example, refer to Patent Literature 1 to 3). In this system, a TIR1 that configures an auxin-responsive ubiquitin ligase is introduced into a cell derived from a eukaryote such as a yeast or an animal cell, and the degradation of a target protein to which a degradation tag (a plant-derived Aux/IAA family protein or a partial protein thereof; also referred to as a degron) has been added is controlled by adjusting the presence or absence or timing of the addition of an auxin.

The method for controlling the degradation of a target protein developed by the present inventors (also referred to as auxin-inducible degron method) has already been broadly used for research in cell biology, and the use of this method for model organisms such as yeasts, nematodes, *Drosophila* and zebrafish is also underway.

CITATION LIST

Patent Literature

[Patent Literature 1]
Japanese Unexamined Patent Application, First Publication No. 2008-187958
[Patent Literature 2]
PCT International Publication No. WO 2010/125620
[Patent Literature 3]
PCT International Publication No. WO 2013/073653

SUMMARY OF INVENTION

Technical Problem

The use of a conventional auxin-inducible degron method makes it possible to rapidly degrade a target protein to which a degradation tag (degron) has been added by the addition of an auxin. However, in the conventional auxin-inducible degron method, even when no auxin is added, weak degradation of a target protein occurs, which makes strict expression control difficult. In addition, a relatively high concentration (100 μM or higher) of an auxin is used for degradation induction, and thus there has been concern over a toxic impact of the auxin particularly on multicellular animals.

The present invention has been made in consideration of the above-described circumstances and provides a non-human animal capable of strictly and freely controlling degradation of a protein, a method for analyzing a function of a target protein, and a method for evaluating a drug discovery target protein or a drug.

Solution to Problem

The present invention includes the following aspects.

[1] An auxin-inducible degron system kit that controls degradation of a target protein in a non-plant-derived eukaryotic cell, the kit containing a first nucleic acid that encodes a mutant TIR1 family protein having a mutation at an auxin-binding site, an auxin analog that has an affinity to the mutant TIR1 family protein, and a second nucleic acid that encodes a degradation tag containing at least a part of an Aux/IAA family protein and having an affinity to a complex of the mutant TIR1 family protein and the auxin analog.

[2] The kit according to [1], further containing a third nucleic acid that encodes the target protein linked upstream or downstream of the second nucleic acid.

[3] The kit according to [1] or [2], in which the mutant TIR1 family protein is a rice-derived protein.

[4] The kit according to any one of [1] to [3], in which the mutant TIR1 family protein is a protein in which an F74 of OsTIR1 has mutated into A, G or S.

[5] The kit according to any one of [1] to [4], in which the auxin analog is a compound represented by the following general formula (1) or an ester body thereof.

[Chem. 1]

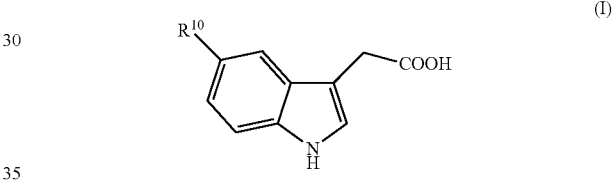

(I)

(In the general formula (I), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[6] The kit according to any one of [2] to [5], further comprising:
a fourth nucleic acid that encodes a linker for controlling a plurality of genes with one promoter and that is linked between the first nucleic acid, and the second nucleic acid and the third nucleic acid.

[7] The kit according to any one of [2] to [6], further containing a transposon vector containing the first nucleic acid and/or the second nucleic acid and the third nucleic acid.

[8] The kit according to any one of [1] to [7], further containing a target genome DNA cleavage enzyme that encodes an endogenous target protein or a fifth nucleic acid that encodes the enzyme.

[9] The kit according to any one of claims [1] to [8], further containing a non-plant-derived eukaryotic cell having the first nucleic acid on a chromosome.

[10] A target protein degradation method, in which the kit according to any one of [1] to [9] is used.

[11] A target protein degradation inducer that is used in an auxin-inducible degron system that controls degradation of a target protein in a non-plant-derived eukaryotic cell, the inducer containing a compound represented by the following general formula (1) or an ester body thereof.

[Chem. 2]

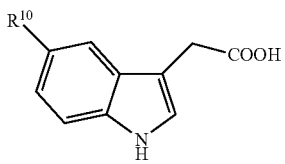

(I)

(In the general formula (1), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[12] A non-plant-derived eukaryotic cell in which an auxin-inducible degron system controls degradation of a target protein in a living body and which has a chromosome containing a first nucleic acid that encodes a mutant TIR1 family protein having a mutation at an auxin-binding site.

[13] The cell according to [12], in which the mutant TIR1 family protein is a rice-derived protein.

[14] The cell according to [12] or [13], in which the mutant TIR1 family protein is a protein in which an F74 of OsTIR1 has mutated into A, G or S.

[15] A compound represented by the following general formula (II).

[Chem. 3]

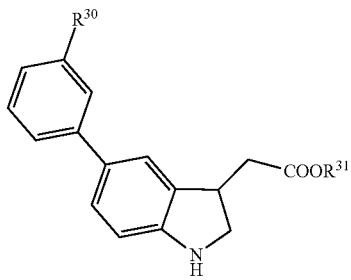

(II)

(In the general formula (II), $R^{30}$ represents a hydrogen atom, an alkyl group having 1 to 6 carbon atoms or a halogen atom and $R^{31}$ represents a hydrogen atom or an alkyl group having 1 to 6 carbon atoms. Here, in a case where $R^{30}$ is a hydrogen atom or an alkyl group having 1 to 6 carbon atoms, $R^{31}$ is an alkyl group having 1 to 6 carbon atoms.)

[16] The cell according to any one of [12] to [15], further includes: a chromosome including a second nucleic acid that encodes a degradation tag containing at least a part of an Aux/IAA family protein and having an affinity to the complex of the mutant TIR1 family protein auxin analog and a third nucleic acid that encodes a target protein linked upstream or downstream of the second nucleic acid.

[17] A non-human animal includes: the cell according to any one of [12] to [16] by transplantation.

[18] A method for evaluating a drug discovery target protein or a drug using the non-human animal according to any one of [12] to [17].

[19] A genetically modified non-human animal in which degradation of a target protein in a living body is controlled by an auxin-inducible degron system, which has a chromosome containing a first nucleic acid that encodes a mutant TIR1 family protein having a mutation at an auxin-binding site and having an affinity to an auxin analog.

[20] The genetically modified non-human animal according to claim [19], in which the mutant TIR1 family protein is a rice-derived protein.

[21] The genetically modified non-human animal according to [19] or [20], in which the mutant TIR1 family protein is a protein in which an F74 of OsTIR1 has mutated into A, G, or S.

[22] The genetically modified non-human animal according to any one of [19] to [21], further includes: a chromosome including a second nucleic acid that encodes a degradation tag containing at least a part of an Aux/IAA family protein and having an affinity to the complex of the mutant TIR1 family protein and the auxin analog and a third nucleic acid that encodes a target protein linked upstream or downstream of the second nucleic acid.

[23] The genetically modified non-human animal according to any one of [19] to [22], which is of a pathological model.

[24] The genetically modified non-human animal according to any one of [19] to [23], in which the auxin analog is a compound represented by the following general formula (I) or an ester body thereof.

[Chem. 4]

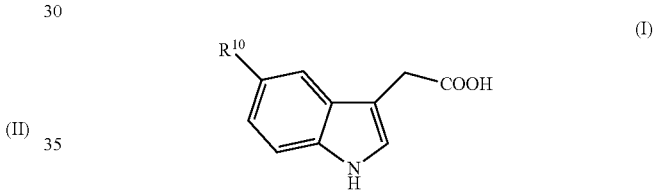

(I)

(In the general formula (I), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[25] A method for analyzing a function of a target protein in vivo using the genetically modified non-human animal according to any one of [19] to [24].

[26] A method for evaluating a drug discovery target protein or a drug using the genetically modified non-human animal according to any one of [19] to [24].

[27] A method for evaluating a drug discovery target protein includes:

Step 1 of administering an auxin analog to a genetically modified non-human animal which has a tissue-specific disease, in which an auxin-inducible degron system controls degradation of a target protein in a living body and which has cells, throughout the body, containing a chromosome including a first nucleic acid that encodes a mutant TIR1 family protein having a mutation at an auxin-binding site and having an affinity to the auxin analog, a chromosome including a second nucleic acid that encodes a degradation target containing at least a part of an Aux/IAA family protein and having an affinity to the complex of the mutant TIR1 family protein and the auxin analog and a third nucleic acid that encodes a target protein linked upstream and downstream of the second nucleic acid;

Step 2 of inducing degradation of the target protein in the living body by the auxin-inducible degron system in each of the cells; and Step 3 of observing an influence of the degradation of the target protein on diseased tissues and normal tissues.

[28] The method for evaluating a drug discovery target protein according to [27], further includes: after Step 3, Step 4 of observing an influence of stopping of administration of the auxin analog and recovery of target protein expression on diseased tissues and normal tissues.

Advantageous Effects of Invention

According to the present invention, it is possible to control degradation of a protein strictly and freely.

BRIEF DESCRIPTION OF DRAWINGS

FIG. 6(A) shows the confirmation results of 5-Ph-IAA-dependent CENPH degradation by Western blotting. FIG. 6(B) is the confirmation results of 5-Ph-IAA-dependent POLD1 degradation by Western blotting.

FIG. 9(A) is the result showing tumor growth suppression after administration of 5-Ph-IAA in nude mice in which mAID-BRD4 cells are xenografted, FIG. 9(B) is the result showing tumor growth suppression after administration of 5-Ph-IAA in nude mice in which mAID-BRD4 cells are xenografted, and FIG. 9(C) is a photograph of a tumor excised after administration of 5-Ph-IAA in nude mice in which mAID-BRD4 cells are xenografted.

FIG. 10(A) is the result showing tumor growth suppression after administration of 5-Ph-IAA in nude mice in which TOP2A-mAID-Clover(TOP2A-mAC) cells are xenografted and FIG. 10(B) is the result showing tumor growth suppression after administration of 5-Ph-IAA in nude mice in which TOP2A-mAID-Clover(TOP2A-mAC) cells are xenografted.

DESCRIPTION OF EMBODIMENTS

<<Auxin-Inducible Degron System Kit>>

Figure 1:
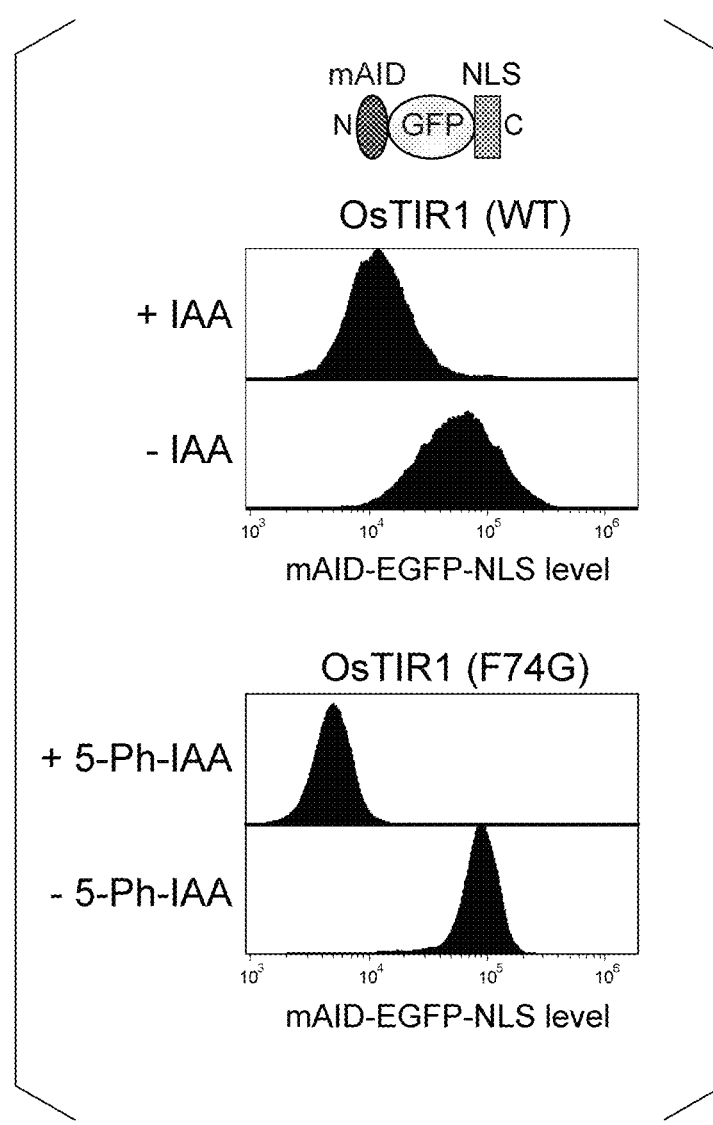
FIG. 1 shows the results of FACS analysis of degradation of a target protein in an OsTIR1(F74G)/mAID-EGFP-NLS expressing cell in Example 1.

A kit of the present invention is an auxin-inducible degron system kit that controls degradation of a target protein in a non-plant-derived eukaryotic cell, the kit containing a first nucleic acid that encodes a mutant TIR1 family protein having a mutation at an auxin-binding site, an auxin analog that has an affinity to the mutant TIR1 family protein, and a second nucleic acid that encodes a degradation tag containing at least a part of an Aux/IAA family protein and having an affinity to a complex of the mutant TIR1 family protein and the auxin analog.

An "auxin-inducible degron system" is a protein degradation control technology developed by the present inventors and is a system in which a plant-specific protein degradation system that is introduced by a plant hormone auxin is applied to a non-plant-derived eukaryotic cell (for example, refer to Patent Literature 1 to 3).

Specifically, this system is a system in which a plant-derived TIR1 family protein as an F-box protein, which is a subunit of an E3 ubiquitin ligase complex (SCF complex), and a target protein labeled with a peptide composed of a plant-derived Aux/IAA family protein or a partial sequence thereof are introduced into a non-plant-derived eukaryotic cell, whereby the TIR1 family protein, which is an auxin receptor, recognizes the peptide composed of the Aux/IAA family protein or the partial sequence thereof and degrades the target protein using a ubiquitin/proteasome degradation system in the non-plant-derived eukaryotic cell in an auxin-dependent manner.

In such a system, the present inventors found a problem of the target protein being degraded in an auxin-independent manner. Regarding such a problem, the present inventors found a combination of a mutant TIR1 family protein having a mutation at an auxin-binding site, an auxin analog that has an affinity to the mutant TIR1 family protein and a degradation tag that contains at least a part of an Aux/IAA family protein and has an affinity to a complex of the mutant TIR1 family protein and the auxin analog.

In addition, the present inventors found that the degradation of the target protein can be induced with a low concentration of the auxin analog.

According to the present invention, it is possible to provide an auxin-inducible degron system in which a target protein is hardly degraded when no auxin is added, but the degradation efficiency of the target protein is extremely high when an auxin is added.

<First Nucleic Acid>

In the present invention, the first nucleic acid encodes a mutant TIR1 family protein having a mutation at an auxin-binding site.

A TIR1 family protein is an F-box protein, which is a subunit that forms an E3 ubiquitin ligase complex (SCF complex) in protein degradation by a ubiquitin-proteasome system, and a plant-specific protein. The TIR1 family protein serves as a receptor of an auxin, which is a growth hormone, and is known to recognize an Aux/IAA family protein, which is an inhibiting factor of an auxin communication system, by receiving an auxin and to degrade a target protein.

As a gene that encodes the TIR1 family protein, the type thereof is not limited as long as the gene encodes plant-derived TIR1 family proteins. In addition, the type of a plant from which the TIR1 family protein is derived is also not limited, and examples thereof include *Arabidopsis*, rice, zinnia, pines, ferns, *Physcomitrella patens* and the like. Specific examples of the gene that encodes the TIR1 family protein include a TIR1 gene, an AFB1 gene, an AFB2 gene, an AFB3 gene, an FBX14 gene, an AFB5 gene and the like.

Among these, an OsTIR1 gene, which is a rice-derived TIR1 gene, is preferable. As such a gene, genes with an accession number NM_001059194 (GeneID: 4335696) or Os04g0395600 or an accession number EAY93933 or OsI_15707 that are registered in NCBI are exemplified, and more specifically, genes composed of a base sequence represented by the sequence number 1 are exemplified. Furthermore, genes composed of a base sequence represented by the sequence number 2, having codons optimized for human cells, are preferable.

In the present invention, the mutant TIR1 family protein has a mutation at an auxin-binding site. Such a mutant protein is not particularly limited as long as the mutant protein has an affinity to the auxin analog to be described below, but is preferably a protein in which the 74$^{th}$ F of OsTIR1 has mutated into A, G or S and more preferably a protein in which the 74$^{th}$ F of OsTIR1 has mutated into G.

Specifically, the mutant TIR1 family protein is particularly preferably a protein that is composed of sequences including any one of the following amino acid sequences (a) to (c) and is bound with the degradation tag through the complex with the auxin analog to guide the target protein to be degraded.

(a) An amino acid sequence in which the amino acid number 74 site of the amino acid sequence represented by the sequence number 3 is glycine.
(b) An amino acid sequence in which one to several amino acids are deleted, inserted, substituted or added in sites other than the amino acid number 74 site of the amino acid sequence (a).
(c) An amino acid sequence that is 80% or more identical at sites other than the amino acid number 74 site of the amino acid sequence (a).

The number of amino acids deleted, inserted, substituted or added in the amino acid sequence (b) is preferably 1 to 120, more preferably 1 to 60, still more preferably 1 to 20, particularly preferably 1 to 10 and most preferably 1 to 5.

In order to be functionally identical to a protein composed of sequences including the amino acid sequence (a), a protein is 80% or more identical. Regarding such an identity, the protein is more preferably 85% or more identical, still more preferably 90% or more identical, particularly preferably 95% or more identical and most preferably 99% or more identical.

As an F74A protein in OsTIR1, proteins composed of an amino acid sequence represented by the sequence number 4 are exemplified, and, as a gene that encodes the F74A protein in OsTIR1, genes composed of a base sequence represented by the sequence number 5 are exemplified.

As an F74G protein in OsTIR1, proteins composed of an amino acid sequence represented by the sequence number 6 are exemplified, and, as a gene that encodes the F74G protein in OsTIR1, genes composed of a base sequence represented by the sequence number 7 are exemplified.

The first nucleic acid that encodes the mutant TIR1 family protein may be DNA having an exon and an intron or may be cDNA composed of an exon. The first nucleic acid that encodes the mutant TIR1 family protein may be, for example, a full-length sequence in genome DNA or a full-length sequence in cDNA. In addition, the first nucleic acid that encodes the mutant TIR1 family protein may be a partial sequence in genome DNA or a partial sequence in cDNA as long as an expressed protein functions as TIR1.

In the present specification, "functioning as the TIR1 family protein" means that, for example, the expressed protein recognizes a degradation tag (a full-length Aux/IAA family protein or a partial protein) in the presence of the auxin analog. This is because the TIR1 family protein is capable of degrading target proteins labeled with a degradation tag as long as the TIR1 family protein is capable of recognizing the degradation tag.

In the kit of the present invention, it is preferable that a promotor sequence that controls the transcription of the first nucleic acid be operably linked to the 5' end of the first nucleic acid that encodes the TIR1 family protein. This makes it possible for the TIR1 family protein to be more reliably expressed.

In the present specification, "being operably linked" means a functional linkage between a gene expression control sequence (for example, a promotor or a series of transcription factor-binding sites) and a gene intended to be expressed (the first nucleic acid that encodes the TIR1 family protein). Here, "expression control sequence" means a sequence that is oriented for the transcription of a gene intended to be expressed (the first nucleic acid that encodes the TIR1 family protein).

The promotor is not particularly limited and can be appropriately determined depending on, for example, the type of a cell or the like. Specific examples of the promotor include a CMV promotor, a SV40 promotor, an EF1a promotor, an RSV promotor and the like.

In the kit of the present invention, the first nucleic acid that encodes the TIR1 family protein and the promotor sequence workably linked upstream may be in a form of being inserted into a vector.

The vector is preferably an expression vector. The expression vector is not particularly limited, and an expression vector suitable for the host cell can be used.

In the vector, a polyadenylation signal, an NLS, a marker gene of a fluorescent protein or the like may be operably linked to the 5' end or 3' end of the first nucleic acid that encodes the TIR1 family protein.

The kit of the present invention may contain a non-plant-derived eukaryotic cell having the first nucleic acid on a chromosome. Such a cell preferably has the first nucleic acid at a safe harbor site.

"Safe harbor site" means a gene region where constant and stable expression occurs and a region where a gene that is intrinsically encoded to this region can be kept alive even in the case of being defective or altered. In the case of inserting foreign DNA (a gene that encodes TIR1 in the present embodiment) into a safe harbor site using a CRISPR system, a PAM sequence is preferably present in the vicinity thereof. Examples of the safe harbor site include a GTP-binding protein 10 gene locus, a Rosa26 gene locus, a beta-actin gene locus, an AAVS1 (the AAV integration site 1) gene locus and the like. Among them, in the case of a human-derived cell, a foreign DNA is preferably inserted into the AAVS1 gene locus.

The cell is not particularly limited as long as the cell is a non-plant-derived eukaryotic cell, and examples thereof include cells of animals, fungi, protists and the like. Examples of the animals include mammals such as humans, mice, rats and rabbits, fish or amphibians such as zebrafish and *Xenopus laevis* and invertebrates such as *C. elegans* and *Drosophila*.

In addition, examples thereof also include established eukaryote-derived cells, ES cells and iPS cells. Specific examples of the eukaryotic cells include established human-derived cells, established mouse-derived cells, established chicken-derived cells, human ES cells, mouse ES cells, human iPS cells, mouse iPS cells and the like. Specific examples thereof include human HCT116 cell, human HT1080 cells, human NALM6 cells, human ES cells, human iPS cells, mouse ES cells, mouse iPS cells, chicken DT40 cells and the like.

In addition, examples of the fungi include *Saccharomyces cerevisiae*, fission yeast and the like.

<Auxin Analog>

In the present invention, the auxin analog is not particularly limited as long as the auxin analog has an affinity to the mutant TIR1 family protein, but is preferably a compound represented by the following general formula (I) or an ester body thereof.

[Chem. 5]

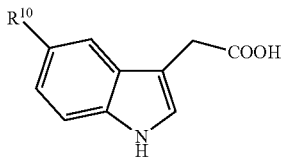

(I)

(In the general formula (I), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[Cyclic Aliphatic Hydrocarbon Group]

The cyclic aliphatic hydrocarbon group as $R^{10}$ may be a monocyclic group or a polycyclic group.

As the monocyclic aliphatic hydrocarbon, a cyclopropyl group, a cyclobutyl group, a cyclopentyl group, a cyclohexyl group, a methylcyclohexyl group, a dimethylcyclohexyl group, a cycloheptyl group, a cyclooctyl group, a cyclononyl group and a cyclodecyl group are exemplified.

As the polycyclic aliphatic hydrocarbon group, a decahydronaphthyl group, an adamantyl group, a 2-alkyladamantan-2-yl group, a 1-(adamantan-1-yl)alkane-1-yl group, a norbornyl group, a methylnorbornyl group, an isobornyl group and the like are exemplified.

In the cyclic aliphatic hydrocarbon group, some carbon atoms that configure the ring may be substituted with heteroatoms. As the heteroatoms, an oxygen atom, a sulfur atom, a nitrogen atom and the like are exemplified. As such a heterocycle, pyrrolidine, tetrahydrofuran, tetrahydrothiophene, piperidine, tetrahydropyran, tetrahydrothiopyran, dioxane, dioxolane and the like are exemplified.

As the substituent, an alkyl group having 1 to 6 carbon atoms, an alkoxy group having 1 to 6 carbon atoms, a halogen atom and an aryl group having 6 to 30 carbon atoms are exemplified.

Examples of the alkyl group include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like.

As the alkoxy group, alkoxy groups in which the R portion of —OR is the same as that of the above-described alkyl group having 1 to 6 carbon atoms are exemplified. Among them, as the alkoxy group having the number of carbons, a methoxy group or an ethoxy group is preferable.

Examples of the halogen atom include a fluorine atom, a chlorine atom, a bromine atom, an iodine atom and the like. Among them, a fluorine atom or a chlorine atom is preferable as the halogen atom.

As the aryl group, a phenyl group, a naphthyl group, a benzyl group, a phenethyl group, a biphenyl group, a pentarenyl group, an indenyl group, an anthranyl group, a tetracenyl group, a pentasenyl group, a pyrenyl group, a peryleneyl group, a fluorenyl group and a phenanthryl group are exemplified.

[Aromatic Hydrocarbon Group]

As the aromatic hydrocarbon group as $R^{10}$, the above-described aryl group having 6 to 30 carbon atoms is exemplified.

In the aromatic hydrocarbon group, some carbon atoms that configure the ring may be substituted with heteroatoms. As the heteroatoms, an oxygen atom, a sulfur atom, a nitrogen atom and the like are exemplified. As such a heterocycle, pyrrole, furan, thiophene, pyridine, imidazole, pyrazole, oxazole, thiazole, pyridazine, pyrimidine, indole, benzimidazole, quinoline, isoquinoline, chromene, isochromene and the like are exemplified.

As the substituent, the same substituents as exemplified in the [Cyclic aliphatic hydrocarbon group] section are exemplified.

The ester body of the compound represented by the general formula (1) is an ester body in which the hydrogen atom in —COOH of the general formula (I) has been substituted with a hydrocarbon group and preferably an ester body in which the hydrogen atom is substituted with an alkyl group.

As such an alkyl group, an alkyl group having 1 to 6 carbon atoms is preferable, and a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3- dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like are exemplified.

As the compound represented by the general formula (I) in which $R^{10}$ is an aromatic hydrocarbon group, a compound represented by the following general formula (I-1) or an ester body thereof is preferable.

[Chem. 6]

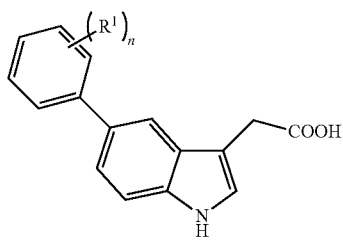

(I-1)

(In the general formula (I-1), $R^1$ is an alkyl group having 1 to 6 carbon atoms, an alkoxy group having 1 to 6 carbon atoms, a halogen atom or an aryl group having 6 to 30 carbon atoms. n is an integer of 0 to 5, and, in a case where n is an integer of 2 to 5, n R's may be identical to or different from each other.)

Examples of the halogen atom as $R^1$ include a fluorine atom, a chlorine atom, a bromine atom, an iodine atom and the like. Among them, a fluorine atom or a chlorine atom is preferable as the halogen atom.

Examples of the alkyl group as $R^1$ include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like. Among them, as the alkyl group having 1 to 6 carbon atoms, a methyl group or an ethyl group is preferable.

As the alkoxy group as $R^1$, alkoxy groups in which the R portion of —OR is the same as that of the above-described alkyl group having 1 to 6 carbon atoms are exemplified. Among them, as the alkoxy group having the number of carbons, a methoxy group or an ethoxy group is preferable.

As the aryl group as $R^1$, a phenyl group, a naphthyl group, a benzyl group, a phenethyl group, a biphenyl group, a pentarenyl group, an indenyl group, an anthranyl group, a tetracenyl group, a pentasenyl group, a pyrenyl group, a peryleneyl group, a fluorenyl group and a phenanthryl group are exemplified.

n of $R^1$ is an integer of 0 to 5 and preferably 0 to 3. In a case where the compound represented by the general formula (I-1) has a plurality of $R^1$'s, the following compound or an ester body thereof is exemplified.

[Chem. 7]

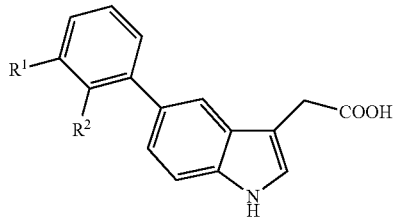

(I-1-1)

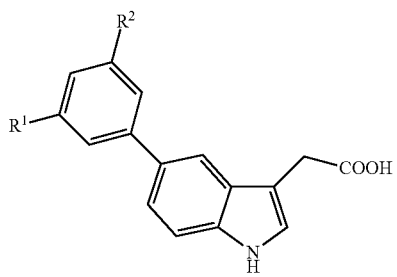

(I-1-2)

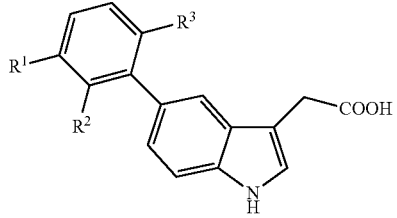

(I-1-3)

(In general formulae (I-1-1) to (I-1-3), $R^1$ to $R^3$ are each independently an alkyl group having 1 to 6 carbon atoms, an alkoxy group having 1 to 6 carbon atoms, a halogen atom or an aryl group having 6 to 30 carbon atoms.)

In the general formulae (I-1-1) to (I-1-3), $R^1$ to $R^3$ are the same as $R^1$ in the general formula (I-1).

In addition, as the compound represented by the general formula (I), compounds to be described below or ester bodies thereof are preferable.

A compound indicated by the following formula (I-1-4) (also referred to as 5-(3-MeOPh)-IAA).

A compound indicated by the following formula (I-1-5) (also referred to as 5-Ph-IAA).

A compound indicated by the following formula (I-1-6) (also referred to as 5-(3,4-diMePh)-IAA).

A compound indicated by the following formula (I-1-7) (also referred to as 5-(3-MePh)-IAA).

A compound indicated by the following formula (I-1-8) (also referred to as 5-(3-ClPh)-IAA).

[Chem. 8]

(I-1-4)

-continued (I-1-5)
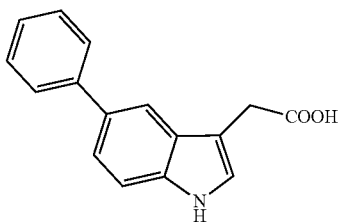

(I-1-6)
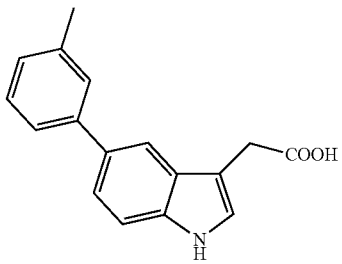

[Chem. 9]

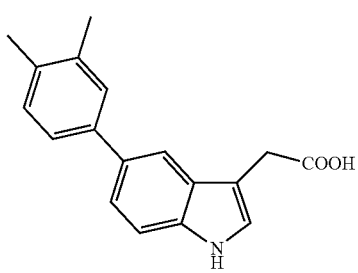

(I-1-7)

(I-1-8)
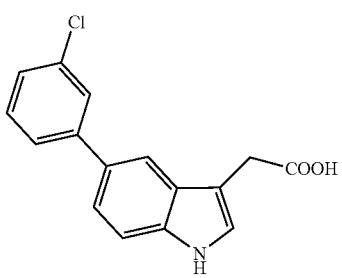

In addition, a compound indicated by the following formula (I-1-9) or an ester body thereof is also preferable.

[Chem. 10]

(I-1-9)
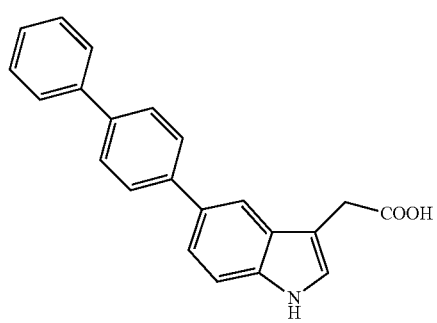

In addition, as the compound in which $R^{10}$ is an aromatic hydrocarbon group, compounds represented by the following formulae (I-2) to (I-5) or ester bodies thereof are also preferable.

[Chem. 11]

(I-2)
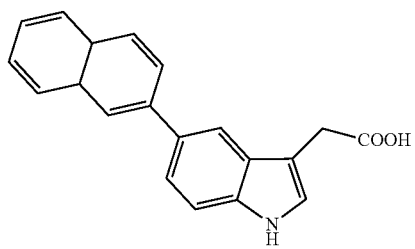

(I-3)
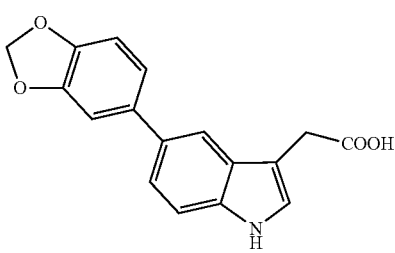

(I-4)
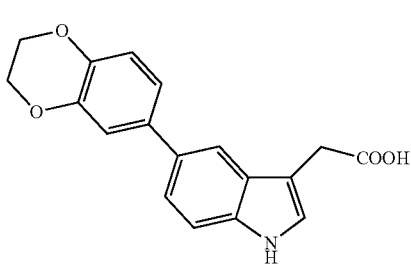

(I-5)
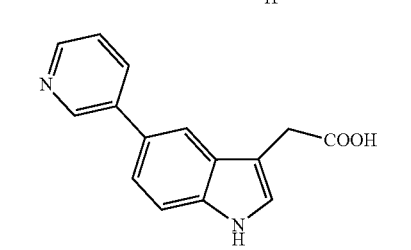

In addition, as the compound in which $R^{10}$ is a cyclic aliphatic hydrocarbon group, a compound represented by the following general formula (I-6) or an ester body thereof is also preferable.

[Chem. 12]

(I-6)
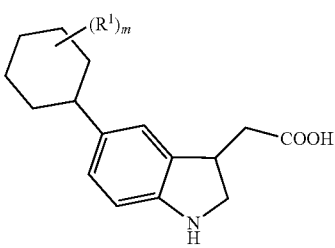

(In the general formula (I-6), $R^1$ is an alkyl group having 1 to 6 carbon atoms, an alkoxy group having 1 to 6 carbon atoms, a halogen atom or an aryl group having 6 to 30 carbon atoms. m is an integer of 0 to 11, and, in a case where m is an integer of 2 to 11, m $R^1$'s may be identical to or different from each other.)

$R^1$ is the same as $R^1$ exemplified in the general formula (I-1). m is preferably 0 to 6 and more preferably 0 to 3.

In addition, as the compound in which $R^{10}$ is a cyclic aliphatic hydrocarbon group, a compound represented by the formula (I-7) or an ester body thereof is also preferable.

[Chem. 13]

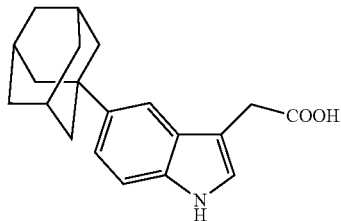

(I-7)

<Second Nucleic Acid>

In the present invention, the second nucleic acid encodes a degradation tag containing at least a part of an Aux/IAA family protein and having an affinity to a complex of the mutant TIR1 family protein and the auxin analog.

As a gene that encodes the Aux/IAA family protein, the type thereof is not particularly limited as long as the gene is a plant-derived Aux/IAA family gene.

Specific examples of the gene that encodes the Aux/IAA family protein include an IAA1 gene, an IAA2 gene, an IAA3 gene, an IAA4 gene, an IAA5 gene, an IAA6 gene, an IAA7 gene, an IAA8 gene, an IAA9 gene, an IAA10 gene, an IAA11 gene, an IAA12 gene, an IAA13 gene, an IAA14 gene, an IAA15 gene, an IAA16 gene, an IAA17 gene, an IAA18 gene, an IAA19 gene, an IAA20 gene, an IAA26 gene, an IAA27 gene, an IAA28 gene, an IAA29 gene, an IAA30 gene, an IAA31 gene, an 1AA32 gene, an 1AA33 gene, an IAA34 gene and the like.

The kit of the present invention may have any one type of full-length or partial sequence of the gene that encodes the Aux/IAA family protein or may have two or more types thereof. For example, the sequence of an arabidopsis-derived Aux/IAA family gene is registered in the Arabidopsis Information Resource (TAIR), and the accession number of each gene is as follows.

The IAA1 gene (AT4G14560), the IAA2 gene (AT3G23030), the IAA3 gene (AT1G04240), the IAA4 gene (AT5G43700), the IAA5 gene (AT1G15580), the IAA6 gene (AT1G52830), the IAA7 gene (AT3G23050), the IAA8 gene (AT2G22670), the IAA9 gene (AT5G65670), the IAA10 gene (AT1G04100), the IAA11 gene (AT4G28640), the IAA12 gene (AT1G04550), the IAA13 gene (AT2G33310), the IAA14 gene (AT4G14550), the IAA15 gene (AT1G80390), the IAA16 gene (AT3G04730), the IAA17 gene (AT1G04250), the IAA18 gene (AT1G51950), the IAA19 gene (AT3G15540), the IAA20 gene (AT2G46990), the IAA26 gene (AT3G16500), the IAA27 gene (AT4G29080), the IAA28 gene (AT5G25890), the IAA29 gene (AT4G32280), the IAA30 gene (AT3G62100), the IAA31 gene (AT3G17600), the IAA32 gene (AT2G01200), the IAA33 gene (AT5G57420), the IAA34 gene (AT1G15050).

Among them, the arabidopsis IAA17 gene is preferable.

The degradation tag is not particularly limited as long as the degradation tag is bound with the complex of the mutant TIR1 family protein and the auxin analog and guides the target protein to be degraded, but preferably contains a full-length or partial protein of mAID as the Aux/IAA family protein.

"mAID" is the abbreviation of "mini-auxin-inducible degron" and is a protein composed of a partial sequence of the arabidopsis IAA17, which is one of the Aux/IAA family proteins. This partial sequence is a sequence composed of a region containing at least two Lys residues at each of the N-terminal side and the C-terminal side of a domain II region of the Aux/IAA family protein or a sequence formed by linking two or more sequences described above. This mAID can become a degradation tag that labels the target protein. For example, the amino acid sequence of the mAID is represented by the sequence number 8.

<Third Nucleic Acid>

In a case where the target protein has been determined, the kit of the present invention may contain a third nucleic acid that encodes the target protein linked upstream or downstream of the second nucleic acid. The second nucleic acid may be disposed adjacent to any of the 5' side or 3' side of the third nucleic acid.

A fused nucleic acid composed of the second nucleic acid and the third nucleic acid, similar to the first nucleic acid, preferably has a promoter sequence operably linked thereto and may be combined into an expression vector.

<Fourth Nucleic Acid>

The first nucleic acid and the second nucleic acid or the fused nucleic acid composed of the second nucleic acid and the third nucleic acid may be each combined into an expression vector, but the kit of the present invention may contain a fourth nucleic acid that encodes a linker for controlling a plurality of genes with one promoter and that is linked between the first nucleic acid, and the second nucleic acid and the third nucleic acid.

As the fourth nucleic acid, a nucleic acid that encodes a read-through linker and a nucleic acid that encodes a non-read-through linker are exemplified.

As the nucleic acid that encodes a read-through linker, a nucleic acid that encodes a cut sequence by an endogenous enzyme is exemplified, and a nucleic acid that encodes a T2A peptide, a nucleic acid that encodes a P2A peptide, a nucleic acid that encodes a F2A peptide and a nucleic acid that encodes an E2A peptide are exemplified.

As the nucleic acid that encodes a non-read-through linker, IRES is exemplified.

<Transposon Vector>

The kit of the present invention may contain a transposon vector containing the first nucleic acid and/or the fused nucleic acid composed of the second nucleic acid and the third nucleic acid.

Specifically, the kit of the present invention preferably contains a vector containing transposon elements at both ends of the first nucleic acid and/or the fused nucleic acid to which the promotor sequence is workably linked and a vector containing a nucleic acid that encodes transposase.

The first nucleic acid and the fused nucleic acid may be each contained in a separate vector; however, in a case where both are contained in one vector, such a vector preferably contains the fourth nucleic acid.

For the transfer of a transposon, an enzyme that catalyzes a transposition reaction (transposase) and DNA that is recognized by this transposase and transferred (transposon element) are required. The kit of the present invention preferably contains such an enzyme and DNA.

In the kit of the present invention, in a case where DNA that encodes the transposase and the transposon element are linked together as transposon DNA and combined into one expression system, the transposon DNA is capable of expressing and transferring the transposase on its own once the transposon DNA is introduced into a cell.

Such an autonomous transposon is possibly transferred from a position to which the transposon has been transferred to another position. Therefore, in order to more stably introduce a target gene into a chromosome, the kit of the present invention preferably contains DNA that encodes the transposase and the transposon element that are each combined into a separate expression system.

The transposon is not particularly limited, and Sleeping Beauty, piggyBac, Tol 2 and the like are exemplified.

<Fifth Nucleic Acid>

The fused nucleic acid composed of the second nucleic acid and the third nucleic acid may be replaced by the endogenous third nucleic acid through homologous recombination; however, in a case where such a fused nucleic acid is combined into an arbitrary chromosome by the transposon or the like, the kit of the present invention preferably contains a target genome DNA cleavage enzyme that encodes an endogenous target protein or a fifth nucleic acid that encodes the above-described enzyme. As a system that is used for the double-strand break of a target genome DNA, a CRISPR-Cas9 system, a transcription activator-like effector nuclease (TALEN) system, a Zn finger nuclease system and the like are exemplified. A method for introducing these systems into a cell is not particularly limited, and the target genome DNA cleavage enzyme itself may be introduced into a cell or a target genome DNA cleavage enzyme expression vector containing the fifth nucleic acid may be introduced into a cell.

For example, in the CRISPR-Cas9 system, a method in which a Cas9 expression vector and an expression vector that encodes guide RNA that induces Cas9 in a site that is intended to be cut are introduced into a cell, a method in which an expressed and purified recombinant Cas9 protein and guide RNA are introduced into a cell, or the like is exemplified. The guide RNA may be divided into two parts of tracrRNA and crRNA or may be sgRNA that is connected to one.

<<Target Protein Degradation Method>>

A target protein degradation method of the present invention is a method in which the above-described kit of the present invention is used. The use of the above-described kit in the auxin-inducible degron system makes strict and full control of target protein degradation possible.

For example, as a method for controlling the degradation of a target protein using the above-described kit, the following method or the like is exemplified.

First, a target protein labeled with a degradation tag and a TIR1 family protein are expressed in a cell. The target protein labeled with a degradation tag and the TIR1 family protein are preferably expressed steadily.

Next, an auxin analog is added to a culture medium. The concentration of the auxin analog that is contained in the culture medium is not limited and is, for example, 1 µM or more and less than 0.1 mM and preferably 10 nM or more and 50 µM or less. As will be described below in examples, in a combination of the compound represented by the general formula (I) and OsTIR1(F74G), it is possible to sufficiently induce degradation of a target protein at a concentration of 50 nM. When a predetermined concentration of an auxin analog is added, a complex of a mutant TIR1 family protein and the auxin analog is formed, this complex recognizes the target protein labeled with a degradation tag, and degradation of the target protein is induced.

According to the degradation method of the present invention, it is possible to induce degradation of a target protein in an auxin analog-specific manner.

<<Compound>>

A compound of the present invention is a compound represented by the following general formula (II).

[Chem. 14]

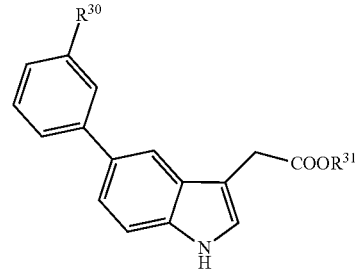

(II)

(In the general formula (II), $R^{30}$ represents a hydrogen atom, an alkyl group having 1 to 6 carbon atoms or a halogen atom and $R^{31}$ represents a hydrogen atom or an alkyl group having 1 to 6 carbon atoms. Here, in a case where $R^{30}$ is a hydrogen atom or an alkyl group having 1 to 6 carbon atoms, $R^{31}$ is an alkyl group having 1 to 6 carbon atoms.)

Examples of the halogen atom as $R^{30}$ include a fluorine atom, a chlorine atom, a bromine atom, an iodine atom and the like. Among them, a fluorine atom or a chlorine atom is preferable as the halogen atom.

Examples of the alkyl group as each of $R^{30}$ and $R^{31}$ independently include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like. Among them, as the alkyl group having 1 to 6 carbon atoms, a methyl group or an ethyl group is preferable.

As the compound represented by the general formula (11), compounds represented by the following formulae (II-1) to (II-4) are preferable.

[Chem. 15]

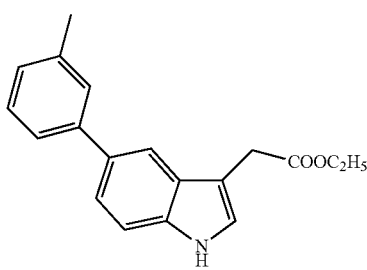

(II-1)

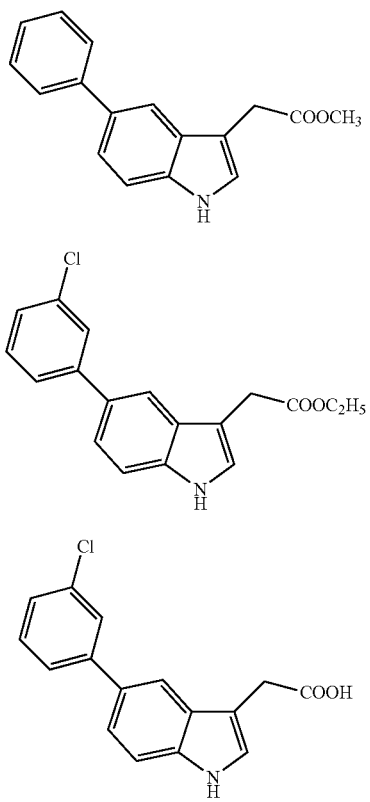

<<Cell>>

A cell of the present invention is a non-plant-derived eukaryotic cell in which an auxin-inducible degron system controls degradation of a target protein in a living body and which has a chromosome containing a first nucleic acid that encodes a mutant TIR1 family protein having a mutation at an auxin-binding site.

The cell of the present invention preferably has the first nucleic acid at a safe harbor site.

The cell is the same as that described in the <<Auxin-inducible degron system kit>> section and is not particularly limited as long as the cell is a non-plant-derived eukaryotic cell, and examples thereof include cells of animals, fungi, protists and the like.

The TIR1 family protein is the same as that described in the <<Auxin-inducible degron system kit>> section, and an OsTIR1 gene, which is a rice-derived TIR1 gene, is preferable.

The mutant TIR1 family protein is the same as that described in the <<Auxin-inducible degron system kit>> section, a protein in which the $74^{th}$ F of OsTIR1 has mutated into A, G or S is preferable, and a protein in which the $74^{th}$ F of OsTIR1 has mutated into G is more preferable.

Specifically, the mutant TIR1 family protein is the same as that described in the <<Auxin-inducible degron system kit>> section and particularly preferably a protein that is composed of sequences including any one of the above-described amino acid sequences (a) to (c) and is bound with the degradation tag through the complex with the auxin analog to guide the target protein to be degraded.

The cell of the present invention preferably further has a chromosome containing a second nucleic acid that encodes a degradation tag containing at least a part of an Aux/IAA family protein and having an affinity to the complex of the mutant TIR1 family protein and the auxin analog and a third nucleic acid that encodes the target protein linked upstream or downstream of the second nucleic acid.

A method for introducing the first nucleic acid, the second nucleic acid and the third nucleic acid into the chromosomes is not particularly limited, and, as described in the <<Auxin-inducible degron system kit>> section, the nucleic acids may be introduced using a genome-editing technology such as a CRISPR system or may be introduced using a transposon vector.

<<Non-Human Animal>>

First Embodiment

A non-human animal in this embodiment is a non-human animal containing, through transplantation, cells in which an auxin-inducible degron system controls degradation of a target protein in a living body, in which each of the cells contains a chromosome containing a first nucleic acid that encodes a mutant TIR1 family protein having a mutation at an auxin-binding site and having an affinity to an auxin analog.

The non-human animal in the embodiment includes the cells of the present invention described above through transplantation. A transplantation site is not particularly limited and examples thereof include intrasubcutaneous tissues, the spleen, and a tail vein.

Examples of the non-human animal include cats, dogs, horses, monkeys, cows, sheep, pigs, goats, rabbits, hamsters, guinea pigs, rats, mice, and the like. Among them, rodents are preferable in view of the results of drug evaluation. Examples of the rodents include hamsters, guinea pigs, rats, mice, and the like and rats and mice are preferable.

It is preferable that animals to be transplanted to be immunocompromised animals and examples thereof include nude mice, SCID mice, and NOG mice.

The non-human animal of the present invention can be suitably used for drug evaluation using a xenograft model. For example, cells in which a degron tag is added to a target molecule of an anti-cancer drug may be constructed and the cells be transplanted under the skin of nude mice to construct xenograft mice in which a tumor is formed. If the auxin analog is administered to such mice, it is possible to construct a system in which the auxin analog reaches the transplanted cells, degrades a target molecule, kills the cells, and the contraction of the tumor is observed. It is possible to evaluate an anti-tumor effect by administering a prepared drug to similar mice using this system as a control.

A method for administrating an auxin analog is not particularly limited and examples thereof include intraperitoneal administration, intravenous administration, intraarterial administration, intramuscular administration, intradermal administration, subcutaneous administration, oral administration, and the like. A dose is, for example, preferably 0.1 mg/kg to 100 mg/kg, more preferably 0.2 mg/kg to 50 mg/kg, and even more preferably 0.5 mg/kg to 20 mg/kg per day. An administration period is preferably 1 to 10 days, and more preferably 3 to 7 days.

Second Embodiment

A non-human animal in this embodiment is a genetically modified non-human animal in which an auxin-inducible degron system controls degradation of a target protein in a living body and which has a chromosome containing a first nucleic acid that encodes a mutant TIR1 family protein having a mutation at an auxin-binding site and having affinity to an auxin analog The type of TIR1 family protein is not limited as long as it is a plant-derived TIR1 family protein. Furthermore, a type of plant from which it is derived is not limited, and examples thereof include *Arabidopsis thaliana*, rice, Zinnia, pines, ferns, and *Physcomitrella patens*.

Among them, an OsTIR1 protein which is a TIR1 protein derived from rice is preferable.

In the present invention, the mutant TIR1 family protein has a mutation at the auxin-binding site. Although such a mutation protein is not particularly limited as long as it has an affinity to an auxin analog which will be described later, a $74^{th}$ F of OsTIR1 has preferably mutated to A, G, or S, and more preferably mutated to G.

To be specific, the mutant TIR1 family protein is particularly preferably a protein which includes a sequence containing any one of the following amino acid sequences (a) to (c), binds to a degradation tag via a complex with an auxin analog, and leads to degradation of a target protein:

(a) An amino acid sequence in which a $74^{th}$ amino acid of an amino acid sequence represented by SEQ ID NO:3 is glycine, (b) An amino acid sequence in which one to several amino acids have been deleted, inserted, substituted, or added at a site other than a $74^{th}$ amino acid in (a) described above, and (c) An amino acid sequence having 80% or more identify at sites other than a $74^{th}$ amino acid in (a) above.

The number of amino acids deleted, inserted, substituted, or added in (b) is preferably 1 to 120, more preferably 1 to 60, further preferably 1 to 20, particularly preferably 1 to 10, and most preferably 1 to 5.

In order to be functionally equivalent to a protein having a sequence containing the amino acid sequence of (a), the amino acid sequence has 80% or more identify. As for such identity, 85% or more is more preferable, 90% or more is further preferable, 95% or more is particularly preferable, and 99% or more is most preferable.

It is preferable that the non-human animal in the embodiment further include a chromosome containing a second nucleic acid that encodes a degradation tag containing at least a part of an Aux/IAA family protein and having an affinity to a complex of the mutant TIR1 family protein and the auxin analog and a third nucleic acid that encodes a target protein linked upstream or downstream of the second nucleic acid.

It is preferable that the third nucleic acid encode an endogenous target protein.

To be specific, it is preferable that the third nucleic acid that encodes the endogenous target protein on the chromosome be replaced by a fusion nucleic acid composed of a second nucleic acid that encodes a degradation tag and a third nucleic acid through homologous recombination.

Also, substitution of such a fusion nucleic acid on the chromosome may be performed at the time of producing the genetically modified non-human animal of the present invention as in the case of the first nucleic acid that encodes the mutant TIR1 family protein or may be performed through genome editing using a separate vector after preparation of a genetically modified non-human animal having a chromosome containing the first nucleic acid.

The non-human animal in the embodiment is suitable for functional analysis of a protein in a living body. The target protein degrades due to administration of the auxin analog and the function of the protein in vivo can be inferred from the phenotypic analysis of degradation such as canceration and tissue hypoplasia being caused.

Also, it is preferable that the non-human animal in the embodiment be a pathological model. The preferred method of using such a pathological model will be described below.

First, the non-human animal in the embodiment of the present invention can be expected to have the same effect as a knockout non-human animal because the target protein degrades due to administration of the auxin analog. For example, when a neurodegenerative disease is caused due to a gene defect, a pathological model having a neurodegenerative disease phenotype can be obtained due to degradation of the target protein in the genetically modified non-human animal of the present invention. Furthermore, for example, in the genetically modified non-human animal of the present invention, a pathological model of cancer can be obtained by targeting a protein encoded by a tumor suppressor gene.

Also, since embryonic lethality in the non-human animal in the embodiment can be minimized by controlling a timing of administration of the auxin analog, the same effect as that of a conditional knockout non-human animal can be expected.

Furthermore, localizing the expression of mutant TIR1 with a tissue-specific promoter or the like, imparting tissue translocation to the auxin analog, or locally administering the auxin analog can induce the degradation of the tissue-specific target protein.

Second, an existing pathological model may be crossed with the non-human animal in the embodiment to generate a pathological model including an auxin-inducible degron system. As the existing pathological model, a pathological model having a tissue-specific disease is preferable, and examples thereof include a cancer model such as for colorectal cancer, stomach cancer, lung cancer, a neurodegenerative disease model such as for Alzheimer's disease and Parkinson's disease, or lifestyle-related diseases such as diabetes and arteriosclerosis.

For example, in the case in which a colorectal cancer model including the auxin-inducible degron system is generated by crossing the colorectal cancer model with the genetically modified non-human animal of the present invention, it is possible to examine the anti-tumor effect of colorectal cancer when the target protein degrades by administering an auxin analog and to examine the effect of degrading the target protein in normal tissues.

Furthermore, if the auxin analog administration is stopped, the degradation of the target protein is stopped and the expression thereof is restored so that the same effect as when the drug administration for a certain period of time is stopped can be expected.

Such a pathological model is suitable for evaluation of drug target molecules.

It is preferable that the auxin analog be a compound represented by the following general formula (I) or an ester thereof.

[Chem. 16]

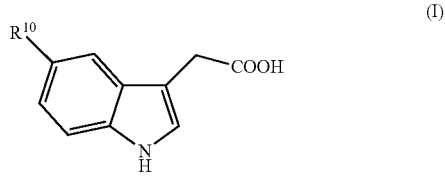

(I)

(In the general formula (1), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

The details of the auxin analog used for the non-human animal in the embodiment are the same as those described in <Auxin analog>.

A method for administrating an auxin analog is the same as that described in the first embodiment, and examples thereof include intraperitoneal administration, intravenous administration, intraarterial administration, intramuscular administration, intradermal administration, subcutaneous administration, oral administration, and the like. A dose is, for example, preferably 0.1 mg/kg to 100 mg/kg, more preferably 0.2 mg/kg to 50 mg/kg, and even more preferably 0.5 mg/kg to 20 mg/kg per day. An administration period is preferably 1 to 10 days, and more preferably 3 to 7 days.

EXAMPLES

Hereinafter, the present invention will be described using examples, but the present invention is not limited to the following examples.

Example 1

1. Synthesis of Auxin Analog

A compound indicated by the formula (I-2) (also referred to as 5-Ph-IAA) was synthesized.

2. Preparation of Cell

An HCT116 cell (human colon adenocarcinoma-derived cell) having DNA in which an OsTIR1(WT) gene or OsTIR1 (F74G) gene and an mAID-EGFP (green fluorescent protein)-NLS (nuclear localization signal) gene were encoded through a P2A sequence inserted onto a chromosome by a transposon (hereinafter, referred to as "OsTIR1(WT)/mAID-EGFP-NLS expressing cell" or "OsTIR1(F74G)/mAID-EGFP-NLS expressing cell") was prepared (refer to FIG. 1).

3. Addition of Auxin Analog

The auxin analog (concentration in culture medium: 0, 200 μM) was added to the OsTIR1(F74G)/mAID-EGFP-NLS expressing cell and cultured for 24 hours. In addition, as a control, a cell containing an auxin added to the OsTIR1(WT)/mAID-EGFP-NLS expressing cell was also prepared.

3. FACS Analysis

After 24 hours from the addition of the auxin analog, the cells were collected, and FACS analysis was performed. The results are shown in FIG. 1.

FIG. 1 shows that, in the OsTIR1(F74G)/mAID-EGFP-NLS expressing cell to which the auxin analog was added, expression before degradation induction was high and uniform compared with the OsTIR1(WT)/mAID-EGFP-NLS expressing cell.

Furthermore, in the OsTIR1(F74G)/mAID-EGFP-NLS expressing cell to which the auxin analog was added, degradation of GFP was observed more sharply compared with that in the OsTIR1(WT)/mAID-EGFP-NLS expressing cell to which an auxin was added.

Example 2

1. Synthesis of Auxin Analogs

A compound indicated by a formula (I-1-5) (also referred to as 5-Ph-IAA), a compound indicated by a formula (I-1-6) (also referred to as 5-(3,4-diMePh)-IAA), a compound indicated by a formula (I-1-7) (also referred to as 5-(3-MePh)-IAA) and a compound indicated by a formula (I-1-8) (also referred to as 5-(3-ClPh)-IAA) were synthesized. The compound indicated by the formula (I-1-4) (also referred to as 5-(3-MeOPh)-IAA) was procured from Tokyo Chemical Industry Co., Ltd.

Hereinafter, a method for synthesizing the synthesized compounds will be described.

Synthesis of 5-bromoindole 3-acetic acid methyl ester

[Chem. 17]

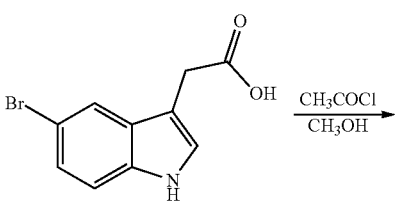

A methanol solution (25 mL) of 5-bromoindole 3-acetic acid (500 mg, 1.97 mmol) was fed into a 100 mL round-bottomed flask, and 1 mL of acetyl chloride was added dropwise thereto under stirring. A reaction was caused at room temperature for three hours. The reaction solution was poured into 100 mL of water, and this was extracted twice with 50 mL of ethyl acetate. An organic layer was washed with 100 mL of saturated salt water, then dehydrated with anhydrous sodium sulfate and condensed under reduced pressure, thereby obtaining 5-bromoindole 3-acetic acid methyl ester of a ginger oil (26 mg, 1.96 mmol, yield: 99%).

The analysis results of the obtained compound by $^{1}$H-NMR and $^{13}$C-NMR are shown below.

$^{1}$H-NMR (400 MHz, CDCl$_3$) δ 8.17 (s, 1H), 7.73 (d, J=1.8 Hz, 1H), 7.28 (dd, J=7.6, 5.7 Hz, 1H), 7.20 (dd, J=13.5, 4.8 Hz, 1H), 7.16-7.10 (m, 1H), 3.75-3.70 (m, 2H), 3.71 (s, 3H), $^{13}$C-NMR (100 MHz, CDCl$_3$) δ C 172.33, 134.80, 129.06, 125.21, 124.42, 121.59, 113.12, 112.730, 108.24, 52.18, 30.98.

Synthesis of 5-phenyl-indole-3-acetic acid methyl ester

[Chem. 18]

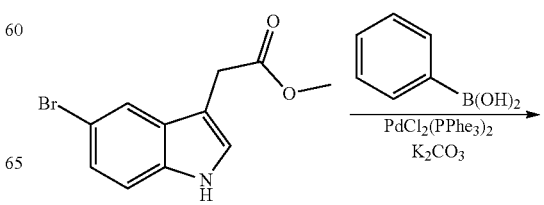

-continued

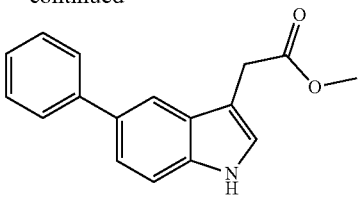

5-Bromoindole 3-acetic acid methyl ester (540 mg, 2.01 mmol), phenylboronic acid (467 mg, 3.83 mmol) and bis(triphenylphosphine)palladium (II) dichloride [$PdCl_2$ $(PPhe_3)_2$: 67 mg, 0.095 mmol] were added to a 50 mL round-bottomed flask containing 5 mL of dimethylformamide, 5 mL of ethanol and 2 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-phenyl-indole 3-acetic acid methyl ester was obtained as an orange oil (134 mg, 0.50 mmol, yield: 25.1%)

The analysis results of the obtained compound by $^1$H-NMR and $^{13}$C-NMR are shown below.

$^1$H-NMR (400 MHz, $CDCl_3$) δ 8.14 (s, 1H), 7.82 (s, 1H), 7.69-7.61 (m, 2H), 7.43 (t, J=7.8 Hz, 3H), 7.40-7.34 (m, 1H), 7.34-7.28 (m, 1H), 7.16 (d, J=10.1 Hz, 1H), 4.17 (qd, J=7.1, 4.0 Hz, 2H), 3.81 (s, 3H), $^{13}$C-NMR (100 MHz, $CDCl_3$) δC 172.19, 142.64, 135.74, 133.37, 128.74, 127.52, 126.44, 123.88, 122.18, 117.53, 111.52, 109.04, 60.95, 31.50.

Synthesis of 5-phenyl-indole-3-acetic acid methyl ester (compound indicated by formula (I-1-5) (also referred to as 5-Ph-IAA))

[Chem. 19]

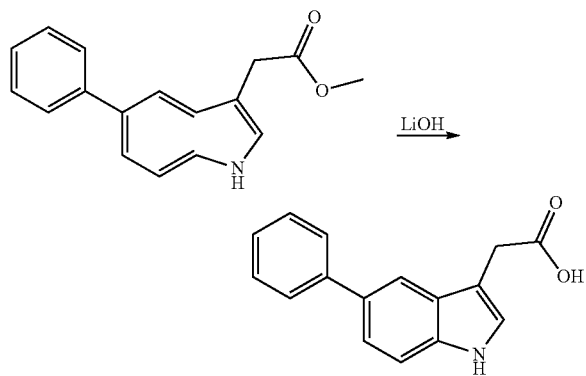

5-Phenyl-indole-3-acetic acid methyl ester (124 mg, 0.47 mmol) was placed in a 10 mL round-bottomed flask, and 1 mL of methanol and 1 mL of tetrahydrofuran were added thereto. A lithium hydroxide aqueous solution (23 mg, 0.96 mmol dissolved in 1 mL of water) was added dropwise to this. This reaction solution was stirred at room temperature for two hours to be hydrolyzed. 5 mL of 1M dilute hydrochloric acid and 5 mL of ethyl acetate were added to the reaction solution to extract a product into an ethyl acetate layer. Furthermore, the product was extracted three times with 5 mL of ethyl acetate. This organic layer was washed with 10 mL of saturated salt water, then dehydrated by adding anhydrous sodium sulfate thereto and condensed under reduced pressure. The concentrate was purified by silica gel column chromatography (chloroform:acetone=95:5), and 5-phenyl-indole 3-acetic acid was obtained as a caramel powder (98 mg, 0.39 mmol, yield: 83.4%).

The analysis results of the obtained compound by $^1$H-NMR and $^{13}$C-NMR are shown below.

$^1$H-NMR (400 MHz, acetone-$d_6$) δ 10.61 (s, 1H), 10.17 (s, 1H), 7.89 (s, 1H), 7.68-7.65 (m, 2H), 7.48-7.46 (m, 1H), 7.44-7.40 (m, 3H), 7.34 (d, J=2.3 Hz, 1H), 7.26 (tt, J=7.3, 1.4 Hz, 1H), 3.82 (s, 2H), $^{13}$C-NMR (100 MHz, acetone-$d_6$) δ 173.20, 143.65, 137.15, 133.06, 129.51, 129.15, 127.86, 126.96, 125.39, 121.85, 118.07, 112.54, 109.65, 31.39

Synthesis of 5-phenyl-indole-3-acetic acid methyl ester

[Chem. 20]

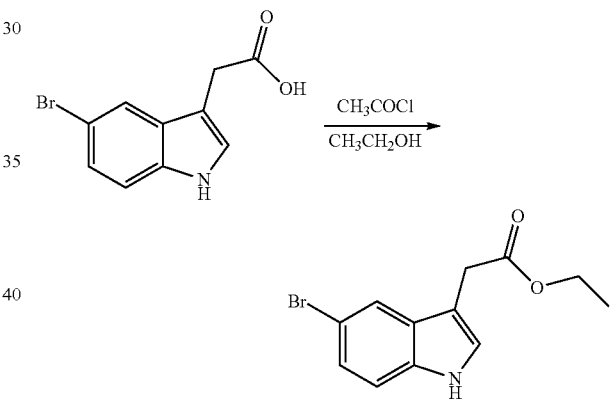

An ethanol solution (25 mL) of 5-bromoindole 3-acetic acid (508 mg, 2.00 mmol) was fed into a 100 mL round-bottomed flask, and 1 mL of acetyl chloride was added dropwise to this under stirring. This reaction solution was stirred at room temperature for three hours. The reaction solution was poured into 100 mL of water, and this was extracted twice with 50 mL of ethyl acetate. An organic layer was washed with 100 mL of saturated salt water, then dehydrated with anhydrous sodium sulfate and condensed under reduced pressure, thereby obtaining 5-bromoindole 3-acetic acid ethyl ester of a ginger oil (556 mg, 1.97 mmol, yield: 99%).

The analysis results of the obtained compound by $^1$H-NMR and $^{13}$C-NMR are shown below.

$^1$H-NMR (400 MHz, $CDCl_3$) δ 8.23 (s, 1H), 7.73 (s, 1H), 7.24 (dd, J=8.5, 2.1 Hz, 1H), 7.15 (d, J=8.7 Hz, 1H), 7.07 (s, 1H), 4.18 (q, J=7.2 Hz, 2H), 3.71 (s, 2H), 1.28 (t, J=7.3 Hz, 3H), $^{13}$C-NMR (100 MHz, $CDCl_3$) δ 172.07, 134.82, 129.05, 125.08, 124.49, 121.64, 112.99, 112.77, 108.21, 61.11, 31.31, 14.32.

Synthesis of 5-(3-methylphenyl)-indole-3-acetic acid ethyl ester

[Chem. 21]

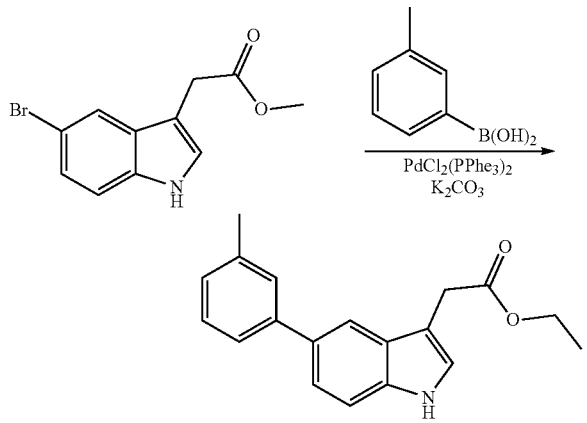

5-Bromoindole 3-acetic acid methyl ester (112 mg, 0.40 mmol), 3-methylphenylboronic acid (107 mg, 0.79 mmol) and bis(triphenylphosphine)palladium (II) dichloride (PdCl$_2$(PPhe$_3$)$_2$: 15 mg, 0.02 mmol) were added to a 50 mL round-bottomed flask containing 1 mL of dimethylformamide, 1 mL of ethanol and 0.5 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-(3-methylphenyl)-indole 3-acetic acid ethyl ester was obtained as a yellow oil (17 mg, 0.058 mmol, yield: 14.6%).

The analysis results of the obtained compound by $^1$H-NMR and $^{13}$C-NMR are shown below.

$^1$H-NMR (400 MHz, CDCl$_3$) δ 8.10 (s, 1H), 7.81 (s, 1H), 7.49-7.42 (m, 3H), 7.39 (d, J=8.2 Hz, 1H), 7.32 (t, J=7.8, 1H), 7.19 (d, J=1.1 Hz, 1H), 7.16-7.11 (m, 1H), 4.18 (q, J=7.6, 2H), 3.82 (s, 2H), 2.41 (s, 3H), 1.27 (t, J=7.1 Hz, 3H), $^{13}$C-NMR (100 MHz, CDCl$_3$) δC 172.12, 142.59, 138.23, 135.68, 133.51, 128.62, 128.32, 127.84, 127.19, 124.61, 123.74, 122.24, 117.51, 111.39, 109.13, 60.91, 31.49, 21.67, 14.34.

Synthesis of 5-(3-methylphenyl)-indole-3-acetic acid

[Chem. 22]

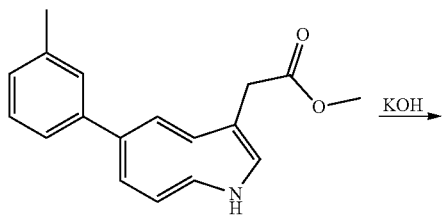

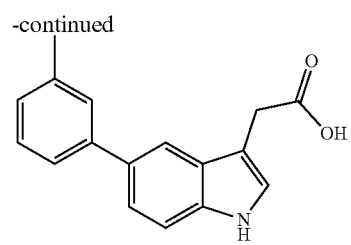

5-(3-Methylphenyl)-indole-3-acetic acid ethyl ester (40 mg, 0.14 mmol) was placed in a 5 mL glass vial, and 0.25 mL of methanol and 0.25 mL of tetrahydrofuran were added thereto. 0.25 mL of a 10% (W/V) potassium hydroxide aqueous solution was added dropwise to this. This reaction solution was stirred at room temperature for two hours to be hydrolyzed. 1 mL of 1M dilute hydrochloric acid and 2 mL of ethyl acetate were added to the reaction solution, and the reaction solution was extracted. Furthermore, the reaction solution was extracted three times with 2 mL of ethyl acetate. This organic layer was washed with 1 mL of saturated salt water, then dehydrated by adding anhydrous sodium sulfate thereto and condensed under reduced pressure. The concentrate was purified by silica gel column chromatography (chloroform:acetone=95:5), and 5-(3-methylphenyl)-indole 3-acetic acid was obtained as a caramel powder (29 mg, 0.11 mmol, yield: 80.2%). The analysis results of the obtained compound by 1H-NMR and $^{13}$C-NMR are shown below.

$^1$H-NMR (400 MHz, CDCl$_3$) δ 8.05 (s, 1H), 7.77 (d, J=1.4 Hz, 1H), 7.48-7.40 (m, 3H), 7.36 (d, J=8.7 Hz, 1H), 7.30 (t, J=7.3 Hz, 1H), 7.16-7.09 (m, 2H), 3.82 (s, 2H), 2.41 (s, 3H), $^{13}$C-NMR (100 MHz, CDCl$_3$) δC 177.84, 142.51, 138.29, 135.63, 133.70, 128.67, 128.36, 127.69, 127.27, 124.68, 124.04, 122.41, 117.34, 111.53, 108.22, 31.07, 21.68.

Synthesis of 5-(3,4-dimethylphenyl)-indole-3-acetic acid ethyl ester

[Chem. 23]

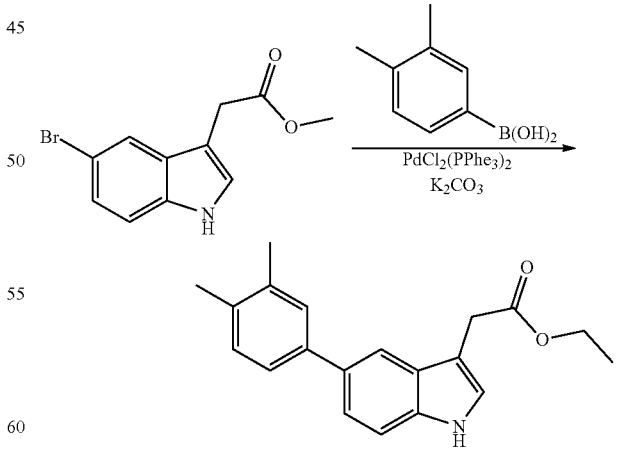

5-Bromoindole 3-acetic acid methyl ester (113 mg, 0.40 mmol), 3,4-dimethylphenylboronic acid (120 mg, 0.80 mmol) and bis(triphenylphosphine)palladium (II) dichloride (PdCl$_2$(PPhe$_3$)$_2$: 15 mg, 0.02 mmol) were added to a 50 mL round-bottomed flask containing 1 mL of dimethylformamide, 1 mL of ethanol and 0.5 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-(3,4-dimethylphenyl)-indole 3-acetic acid ethyl ester was obtained as a yellow oil (36 mg, 0.12 mmol, yield: 29.2%).

The analysis results of the obtained compound by $^1$H-NMR and $^{13}$C-NMR are shown below.

$^1$H-NMR (400 MHz, CDCl$_3$) δ 8.10 (s, 1H), 7.79 (d, J=0.9 Hz, 1H), 7.44 (m, 2H), 7.38 (m, 2H), 7.22-7.14 (m, 2H), 4.17 (q, J=7.0 Hz, 2H), 3.80 (s, 2H), 2.35 (s, 3H), 2.31 (s, 3H), 1.25 (t, J=7.0 Hz, 3H), $^{13}$C-NMR (100 MHz CDCl$_3$) δC 172.17, 140.24, 136.80, 135.55, 134.75, 133.44, 130.30, 128.80, 127.83, 124.85, 123.70, 122.15, 117.23, 111.37, 109.04, 60.89, 31.49, 20.04, 19.46, 14.35

Synthesis of 5-(3,4-dimethylphenyl)-indole-3-acetic acid

[Chem. 24]

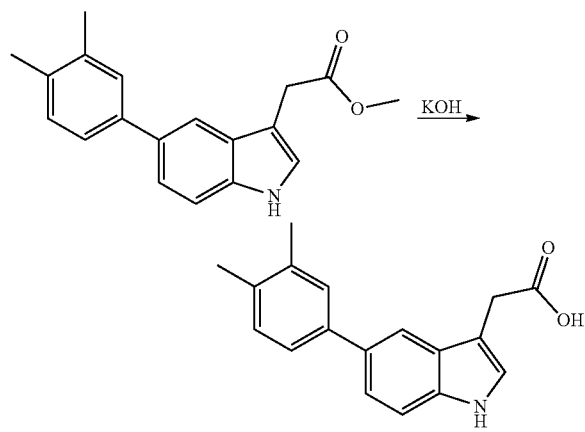

5-(3,4-Dimethylphenyl)-indole-3-acetic acid ethyl ester (30 mg, 0.098 mmol) was placed in a 5 mL glass vial, and 0.25 mL of methanol and 0.25 mL of tetrahydrofuran were added thereto. 0.25 mL of a 10% (W/V) potassium hydroxide aqueous solution was added dropwise to this. This reaction solution was stirred at room temperature for two hours to be hydrolyzed. 1 mL of 1M dilute hydrochloric acid and 2 mL of ethyl acetate were added to the reaction solution, and the reaction solution was extracted. Furthermore, the reaction solution was extracted three times with 2 mL of ethyl acetate. This organic layer was washed with 1 mL of saturated salt water, then dehydrated by adding anhydrous sodium sulfate thereto and condensed under reduced pressure. The concentrate was purified by silica gel column chromatography (chloroform:acetone=95:5), and 5-(3,4-dimethylphenyl)-indole 3-acetic acid was obtained as a caramel powder (20 mg, 0.0716 mmol, yield: 73.4%).

The analysis results of the obtained compound by $^1$H-NMR and $^{13}$C-NMR are shown below.

$^1$H-NMR (400 MHz, CDCl$_3$) δ 8.06 (s, 1H), 7.76 (s, 1H), 7.46-7.40 (m, 2H), 7.37 (d, J=8.2 Hz, 2H), 7.22-7.14 (m, 2H), 3.84 (s, 2H), 2.33 (s, 3H), 2.30 (s, 3H), $^{13}$C-NMR (100 MHz, CDCl$_3$) δC 177.32, 140.13, 136.83, 135.50, 134.83, 133.67, 130.05, 128.83, 127.69, 124.89, 123.91, 122.34, 117.10, 111.45, 108.23, 30.99, 20.03, 19.46.

Synthesis of 5-(3-chlorophenyl)-indole-3-acetic acid ethyl ester

[Chem. 25]

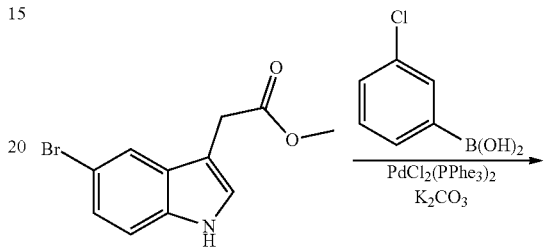

5-Bromoindole 3-acetic acid methyl ester (113 mg, 0.40 mmol), 3-chlorophenylboronic acid (128 mg, 0.82 mmol) and bis(triphenylphosphine)palladium (II) dichloride (PdCl$_2$(PPhe$_3$)$_2$: 15 mg, 0.02 mmol) were added to a 50 mL round-bottomed flask containing 1 mL of dimethylformamide, 1 mL of ethanol and 0.5 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-(3-chlorophenyl)-indole 3-acetic acid ethyl ester was obtained as a yellow oil (25 mg, 0.79 mmol, yield: 19.5%).

The analysis results of the obtained compound by $^1$H-NMR and $^{13}$C-NMR are shown below.

$^1$H-NMR (400 MHz, CDCl$_3$) δ 8.14 (s, 1H), 7.80 (s, 1H), 7.63 (t, J=1.8 Hz, 1H), 7.53 (dt, J=8.0, 1.4 Hz, 1H), 7.42 (d, J=1.4 Hz, 2H), 7.36 (t, J=8.0 Hz, 1H), 7.30-7.24 (m, 1H), 7.23 (d, J=2.3 Hz, 1H), 4.18 (q, J=7.2 Hz, 2H), 3.81 (s, 2H), 1.27 (t, 7.2 Hz, 3H), $^{13}$C-NMR (100 MHz, CDCl$_3$) δC 171.99, 144.48, 135.96, 134.54, 131.96, 129.90, 127.98, 127.52, 126.38, 125.59, 123.99, 121.98, 117.68, 111.61, 109.29, 60.95, 31.45, 14.34.

Synthesis of 5-(3-chlorophenyl)-indole-3-acetic acid (compound indicated by formula (I-1-8) (also referred to as 5-(3-ClPh)-IAA))

[Chem. 26]

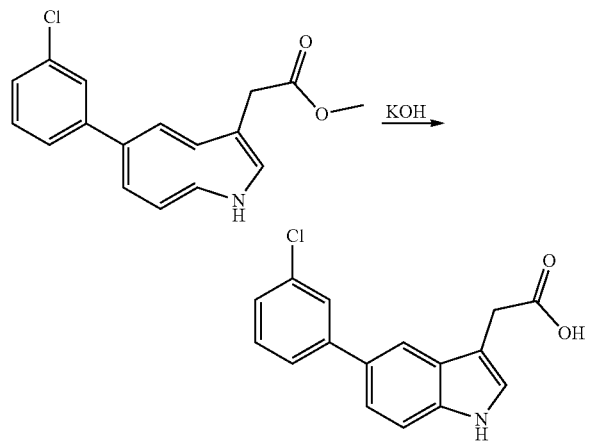

5-(3-Chlorophenyl)-indole-3-acetic acid ethyl ester (38 mg, 0.12 mmol) was placed in a 5 mL glass vial, and 0.25 mL of methanol and 0.25 mL of tetrahydrofuran were added thereto. 0.25 mL of a 10% (W/V) potassium hydroxide aqueous solution was added dropwise to this. This reaction solution was stirred at room temperature for two hours to be hydrolyzed. 1 mL of 1M dilute hydrochloric acid and 2 mL of ethyl acetate were added to the reaction solution, and the reaction solution was extracted. Furthermore, the reaction solution was extracted three times with 2 mL of ethyl acetate. This organic layer was washed with 1 mL of saturated salt water, then dehydrated by adding anhydrous sodium sulfate thereto and condensed under reduced pressure. The concentrate was purified by silica gel column chromatography (chloroform:acetone=95:5), and 5-(3-chlorophenyl)-indole 3-acetic acid was obtained as a caramel powder (31 mg, 0.11 mmol, yield: 89.6%).

The analysis results of the obtained compound by $^1$H-NMR and $^{13}$C-NMR are shown below.

$^1$H-NMR (400 MHz, CDCl$_3$) δ 8.13 (s, 1H), 7.76 (s, 1H), 7.61 (t, J=1.8 Hz, 1H), 7.49 (dt, J=7.8, 1.4 Hz, 1H), 7.40 (s, 2H), 7.34 (t, J=7.8 Hz, 1H), 7.26-7.28 (m, 1H), 7.20 (d, J=2.3 Hz, 1H), 3.82 (s, 2H), $^{13}$C-NMR (100 MHz, CDCl$_3$) δC 177.42, 144.36, 135.92, 134.54, 132.15, 129.94, 127.74, 127.54, 126.45, 125.66, 124.26, 122.15, 117.51, 111.73, 108.39, 30.98.

2. Preparation of Cell

An HCT116 cell (human colon adenocarcinoma-derived cell) in which a plasmid containing an OsTIR1(WT) gene or OsTIR1(F74G) gene was introduced and an mAID-EGFP (green fluorescent protein)-NLS (nuclear localization signal) gene was inserted onto a chromosome (hereinafter, referred to as "OsTIR1(WT)/mAID-EGFP-NLS expressing cell" or "OsTIR1(F74G)/mAID-EGFP-NLS expressing cell") was prepared (refer to FIG. 1).

3. Addition of Auxin Analog

The auxin analog (concentration in culture medium: 0, 50 nM, 100 nM, 500 nM or 1 µM) was added to the OsTIR1 (F74G)/mAID-EGFP-NLS expressing cell and cultured for 24 hours. In addition, as a control, a cell containing an auxin added to the OsTIR1(WT)/nAID-EGFP-NLS expressing cell was also prepared.

4. FACS Analysis

Figure 2:
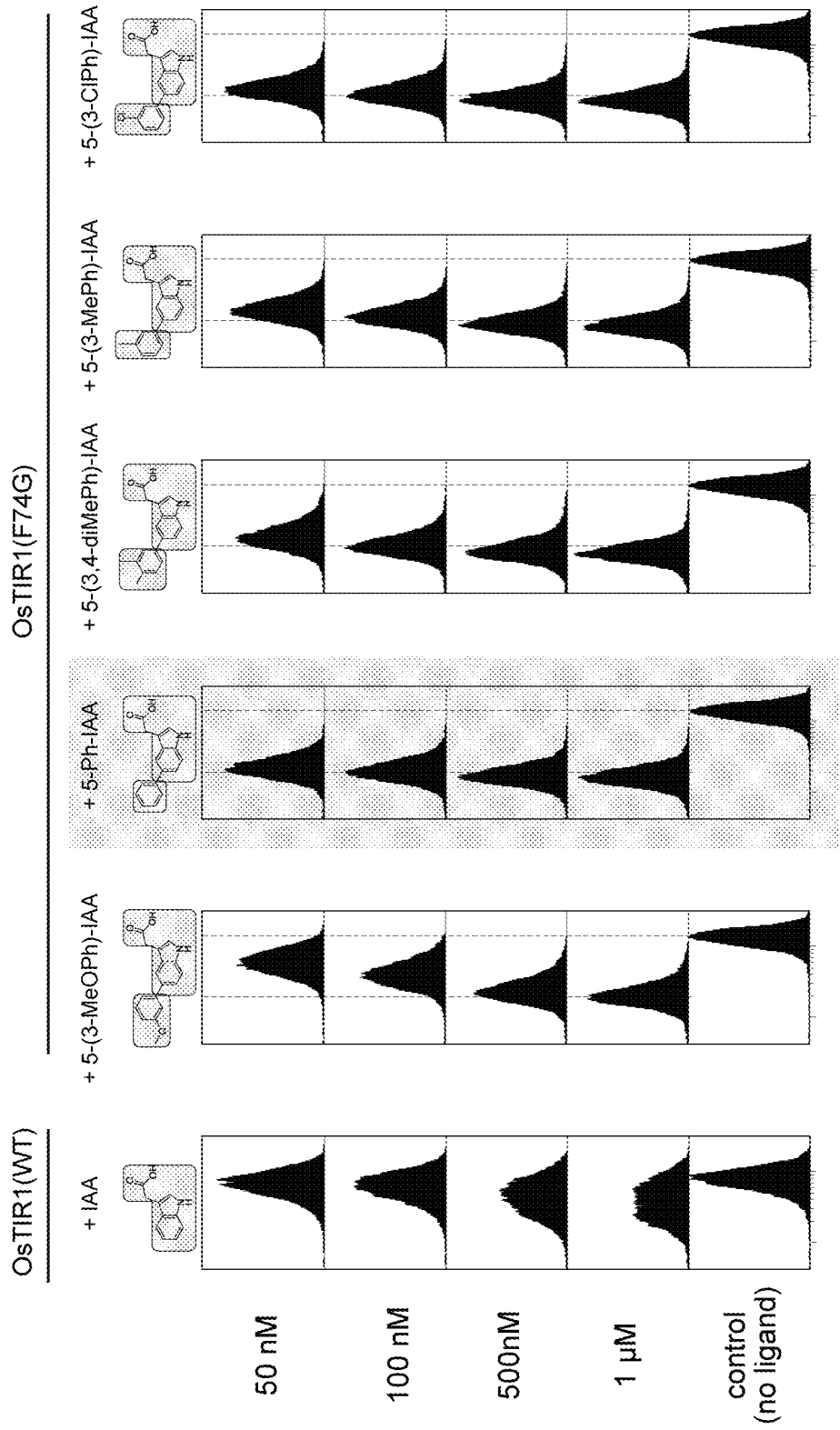
FIG. 2 shows the results of FACS analysis of degradation of a target protein in an OsTIR1 (F74G)/mAID-EGFP-NLS expressing cell by addition of a plurality of types of auxin analogs in Example 2.

After 24 hours from the addition of each auxin analog, the cell was collected, and FACS analysis was performed. The results are shown in FIG. 2. In FIG. 2, "control" indicates cells to which only DMSO as an auxin analog solvent was added.

In the OsTIR1(F74G)/mAID-EGFP-NLS expressing cells to which the auxin analog was added, the degradation of GFP was observed at low concentrations from FIG. 2 compared with the OsTIR1(WT)/mAID-EGFP-NLS expressing cells to which an auxin was added.

Example 3

1. Preparation of Cell

In the HCT116 cell, an OsTIR1(WT) gene or OsTIR1 (F74G) gene was introduced into an AAVS1 gene locus, which is a safe harbor site, using a CRISPR/Cas system, and an OsTIR1(WT)-expressed HCT116 cell or OsTIR1(F74G)-expressed HCT116 cell was constructed.

2. Colony Formation Test

A plasmid vector having mAID, clover and a neomycin resistance gene and having a homologous sequence with respect to a DHC1 gene so as to sandwich mAID and the neomycin resistance gene was introduced into the OsTIR1 (WT)-expressed HCT116 cell or OsTIR1(F74G)-expressed HCT116 cell using a CRISPR/Cas9 system, and homologous recombination with the endogenous DHC1 gene was performed. Next, after selection by G418, the formed colony was dyed using crystal violet. "DHC1" is the abbreviation for dynein heavy chain 1. The results are shown in FIG. 3.

Figure 3:
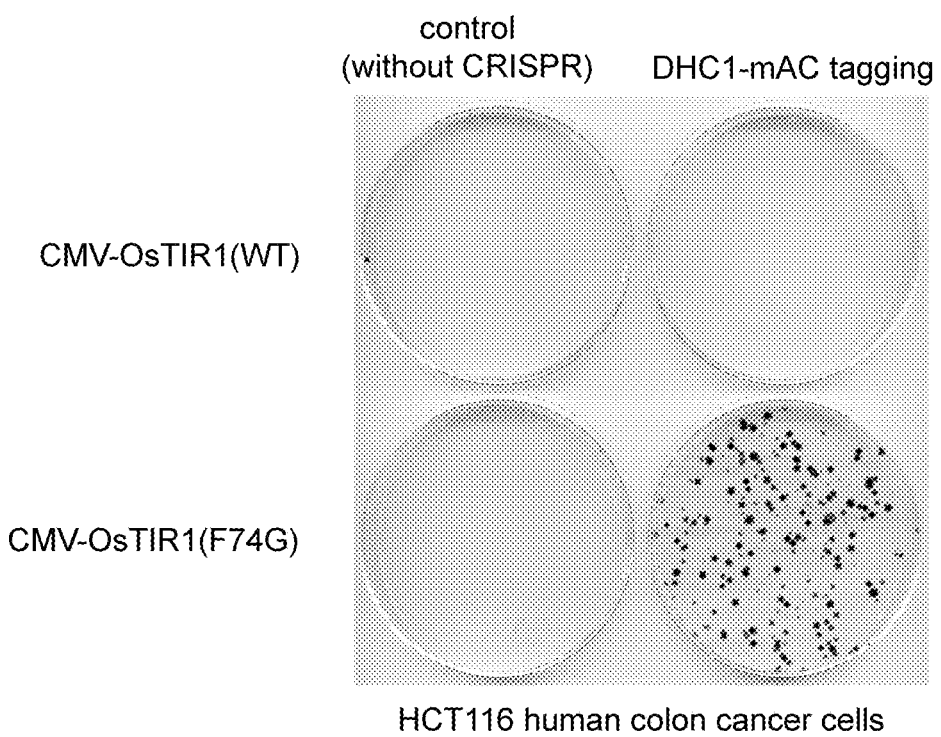
FIG. 3 shows the results of a colony formation test in Example 3.

The colony formation was not confirmed from FIG. 3 since no resistance gene works without CRISPR. In the OsTIR1(WT)-expressed HCT116 cell, the colony formation was not confirmed probably because auxin-independent degradation induction occurred even in the homologous recombinant cell. On the other hand, in the OsTIR1(F74G)-expressed HCT116 cell, the colony formation was confirmed in the homologous recombinant cell.

3. Degradation Induction Test

A degradation induction test of DHC1 was performed using the HCT116 cell expressing OsTIR1(F74G) on which homologous recombination had been performed in the above-described section 2 (hereinafter, referred to as "OsTIR1(F74G)/DHC1-mAID-Clover expressing cell").

Figure 4:
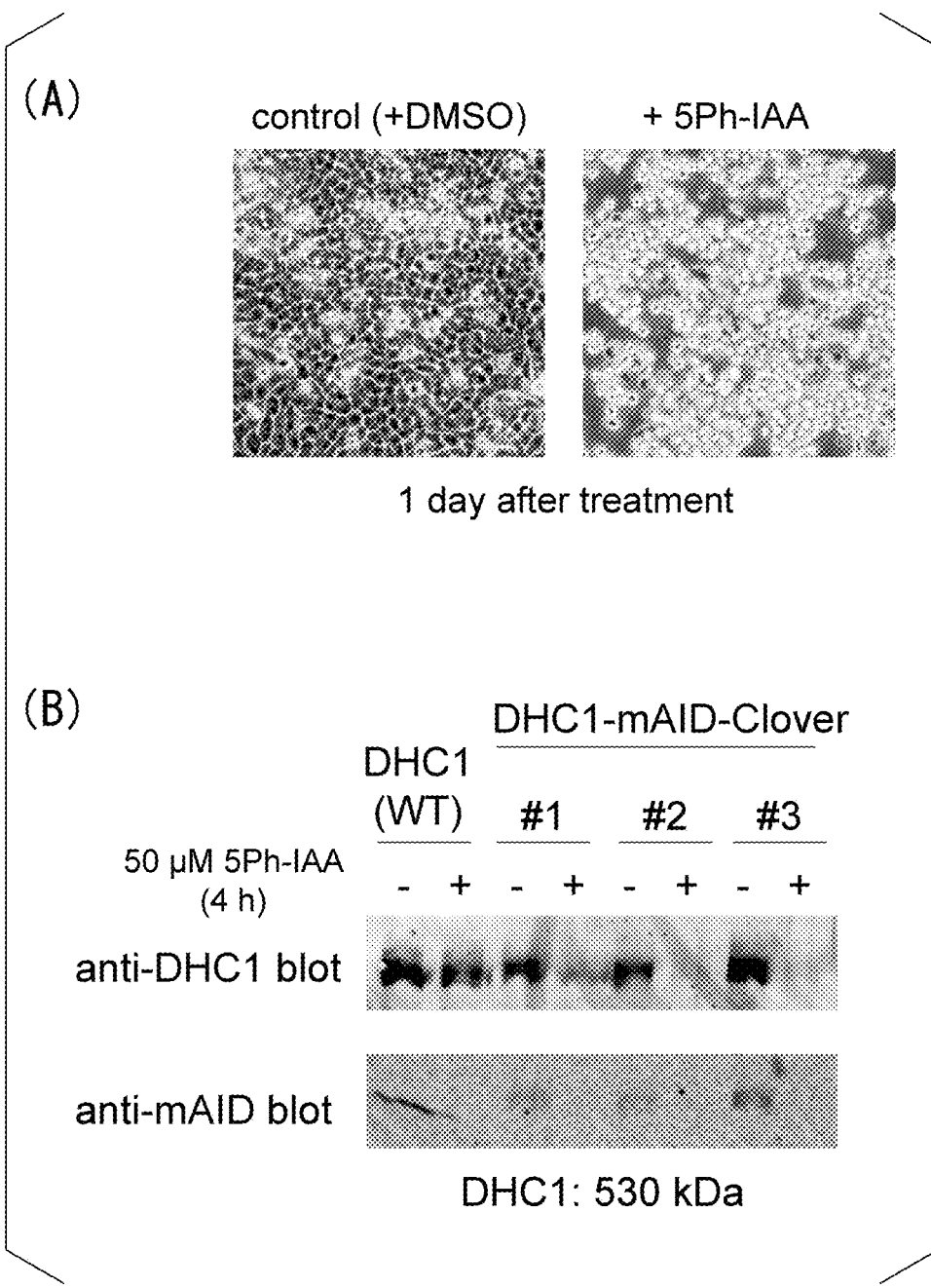
FIG. 4(A) shows microscopic images of an OsTIR1 (F74G)/DHC1-mAID-Clover expressing cell to which 5-Ph-IAA is added.
FIG. 4(B) is the confirmation results of 5-Ph-IAA-dependent DHC1 degradation by Western blotting.

The compound indicated by the formula (I-2) (also referred to as 5-Ph-IAA) was added to the OsTIR1(F74G)/DHC1-mAID-Clover expressing cell, and the appearance of the cell after 24 hours was observed (FIG. 4(A)).

As shown in FIG. 4(A), the addition of 5-Ph-IAA degraded a DHC1-mAID-Clover fused protein, whereby accumulation of cells in the mitotic period was observed.

Furthermore, the degradation of DHC1 was confirmed by Western blotting (FIG. 4(B)). As shown in FIG. 4(B), in all of the clones #1 to #3 produced by homologous recombination, the degradation of DHC1 and mAID was confirmed in a 5-Ph-IAA-dependent manner.

Example 4

In constructing an endogenous target protein degradation system, there are three difficulties described below. (1) Since a number of cultured cells become polyploids, the allele of a target protein has two or more copies. Therefore, it is difficult to construct this degradation system in a variety of cultured cell lines. (2) There is a need to establish a parent strain into which OsTIR1(F74G) has been introduced in advance. (3) It takes time and effort to construct a library of a number of degradation systems.

Figure 5:
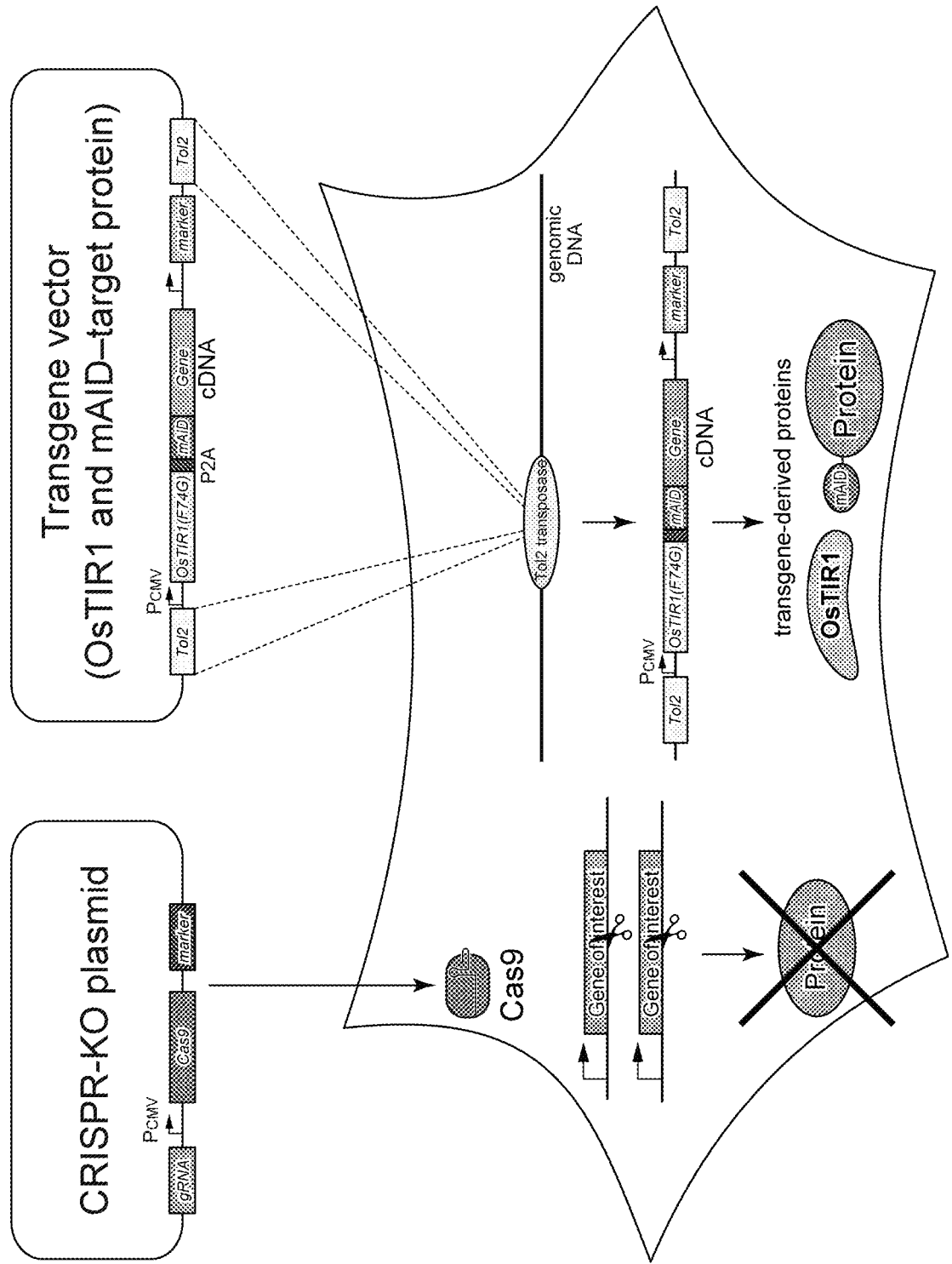
FIG. 5 is a conceptual view of a target protein degradation system.

In order to solve such problems, a new target protein degradation system shown in FIG. 5 was constructed. In this degradation system, (1) a transposon vector in which an OsTIR1(F74G) gene and an mAID-target gene are connected by a P2A linker gene and (2) a CRISPR-KO vector for knocking out an endogenous target gene containing gRNA and a Cas9 gene are contained.

In this degradation system, the OsTIR1(F74G) gene and the mAID-target gene in a genome are integrated by the transposon vector, and an endogenous target gene is knocked out by the CRISPR-KO vector.

The transposon vector in which an OsTIR1(F74G) gene and an mAID-EGFP-CENPH or mAID-EGFP-POLD1 target gene were connected by a P2A linker gene was constructed, and this vector was introduced into a HeLa cell together with the CRISPR-KO vector targeting an endogenous CENPH or POLD1 gene. 5-Ph-IAA was added to such a cell, and the degradation of the target protein was confirmed by Western blotting (FIG. 6).

FIG. 6(A) shows the result of the Western blotting in which an anti-CENPH antibody was used. It was confirmed that the endogenous CENPH gene was knocked out, and the degradation of mAID-EGFP-CENPH was confirmed in a 5-Ph-IAA-dependent manner.

FIG. 6(B) shows the result of the western blotting in which an anti-POLD1 antibody was used. It was confirmed that, in the clones #1 to #3, the endogenous POLD1 gene was knocked out, and the degradation of mAID-EGFP-POLD1 was confirmed in a 5-Ph-IAA-dependent manner.

Example 5

As shown in Example 2, it was confirmed that the auxin-inducible degron system (hereinafter also referred to as an "AID2 system") functioned at a considerably low concentration of 5-Ph-IAA. This AID2 system was applied to mice to control protein expression in living bodies of the mice.

Figure 7:
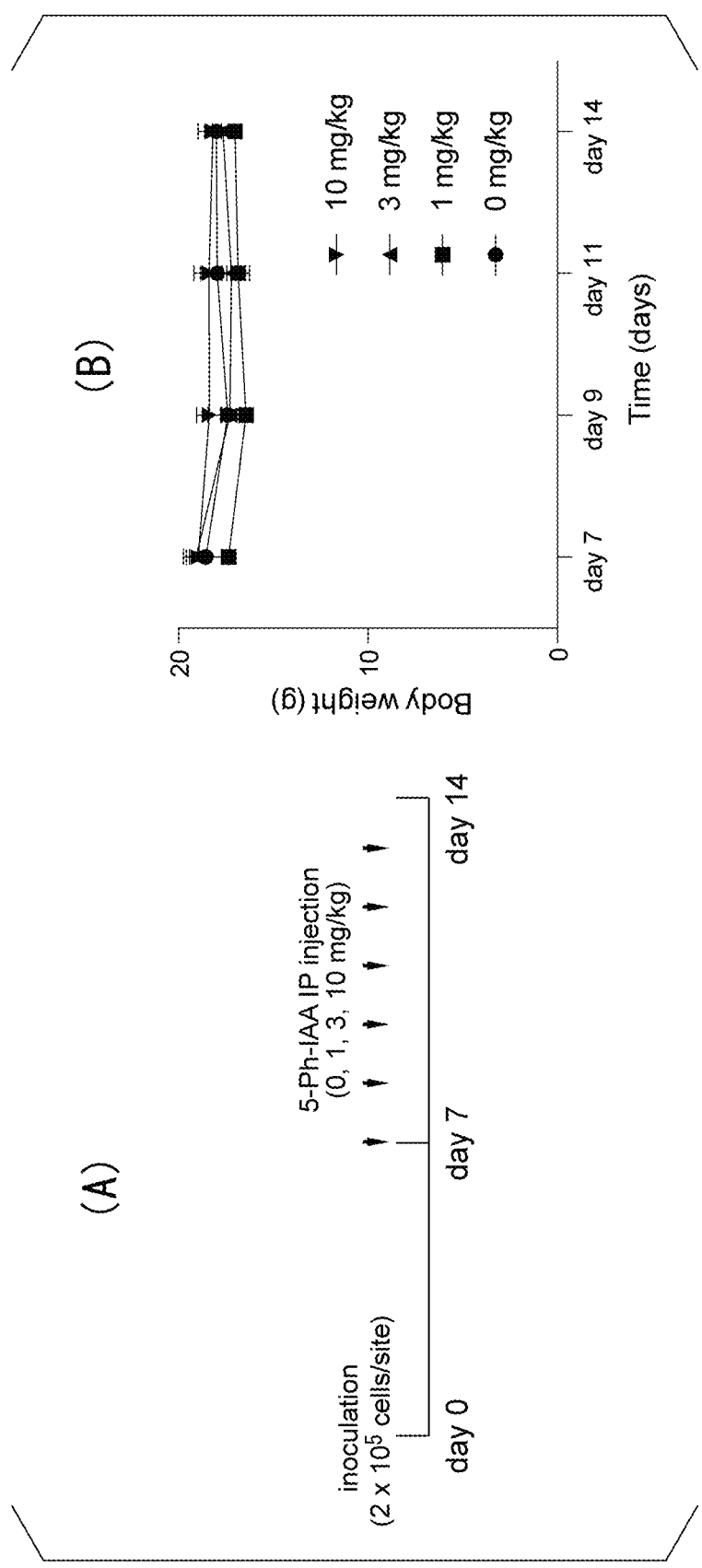
FIG. 7(A) is a diagram showing an administration schedule of 5-Ph-IAA and FIG. 7(B) is a graph showing changes in body weights of mice to which 5-Ph-IAA is administered.

Toxicity was evaluated by intraperitoneally administering 0, 1, 3, and 10 mg/kg of 5-Ph-IAA daily for 1 week. An administration schedule is shown in FIG. 7(A). As shown in FIG. 7(B), a change in body weight of the mice which had been subjected to the administration was not observed.

Figure 8:
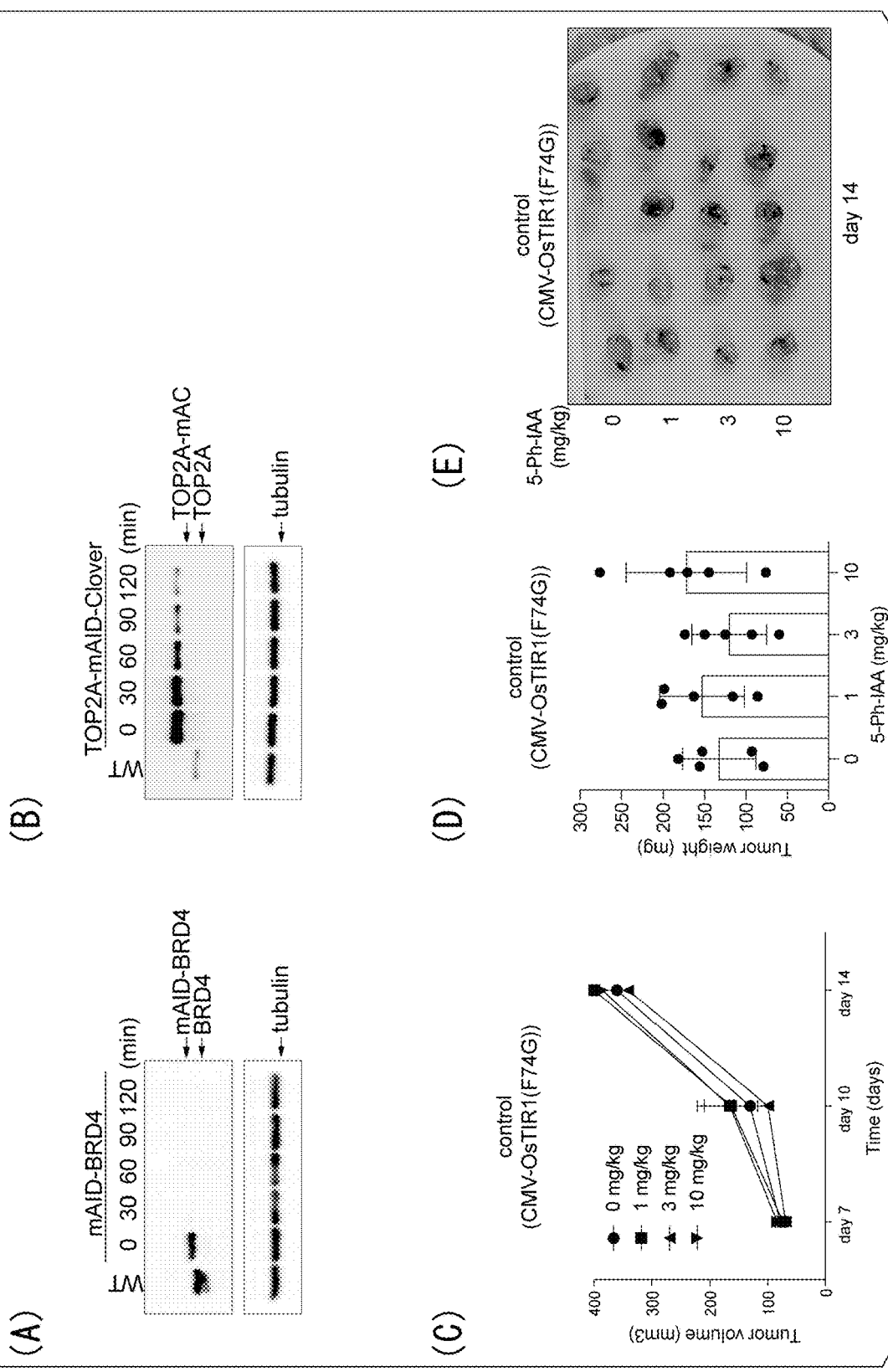
FIG. 8(A) is the result of confirming degradation of mAID-BRD4 using HCT116 CMV-OsTIR1(F74G)
FIG. 8(B) is the result of confirming degradation of mAID-Clover-TOP2A-mAID-Clover(TOP2A-mAC) using HCT116 CMV-OsTIR1(F74G)
FIG. 8(C) is the result showing tumor growth after administration of 5-Ph-IAA in nude mice in which HCT116 cells expressing OsTIR1 (F74G) are xenografted.
FIG. 8(D) is the result showing tumor growth after administration of 5-Ph-IAA in nude mice in which HCT116 cells expressing OsTIR1(F74G) are xenografted.
FIG. 8(E) is a photograph of a tumor excised after administration of 5-Ph-IAA in nude mice in which HCT116 cells expressing OsTIR1(F74G) are xenografted.

Inhibitors for BRD4 and TOP2A are known to be potential anti-cancer agents. As shown in FIGS. 8(A) and 8(B), rapid degradation of mAID-BRD4 or TOP2A-mAID-Clover (TOP2A-mAC) was confirmed using HCT116 CMV-OsTIR1(F74G).

Subsequently, mAID-BRD4 cells or TOP2A-mAC cells were subcutaneously transplanted into nude mice and xenograft tumors were formed in 1 week. After that, 0, 1, 3, and 10 mg/kg of 5-Ph-IAA were intraperitoneally administered daily for an additional week (day 7 to day 14). As shown in FIGS. 8(C) to 8(E), in a control experiment in which HCT116 cells expressing OsTIR1(F74G) were xenografted, the tumor suppression was not observed. On the other hand, as shown in FIGS. 9(A) to 9(C), significant tumor suppression in mAID-BRD4 xenografts was observed at all doses of 5-Ph-IAA. As shown in FIGS. 10(A) and 10(B), a similar tendency was observed when TOP2A-mAC xenografts were used. It was confirmed that, when the AID2 system is used, mAID-BRD4 and TOP2A-mAC were successfully removed in a living body of mice, causing tumor suppression.

Figure 13:
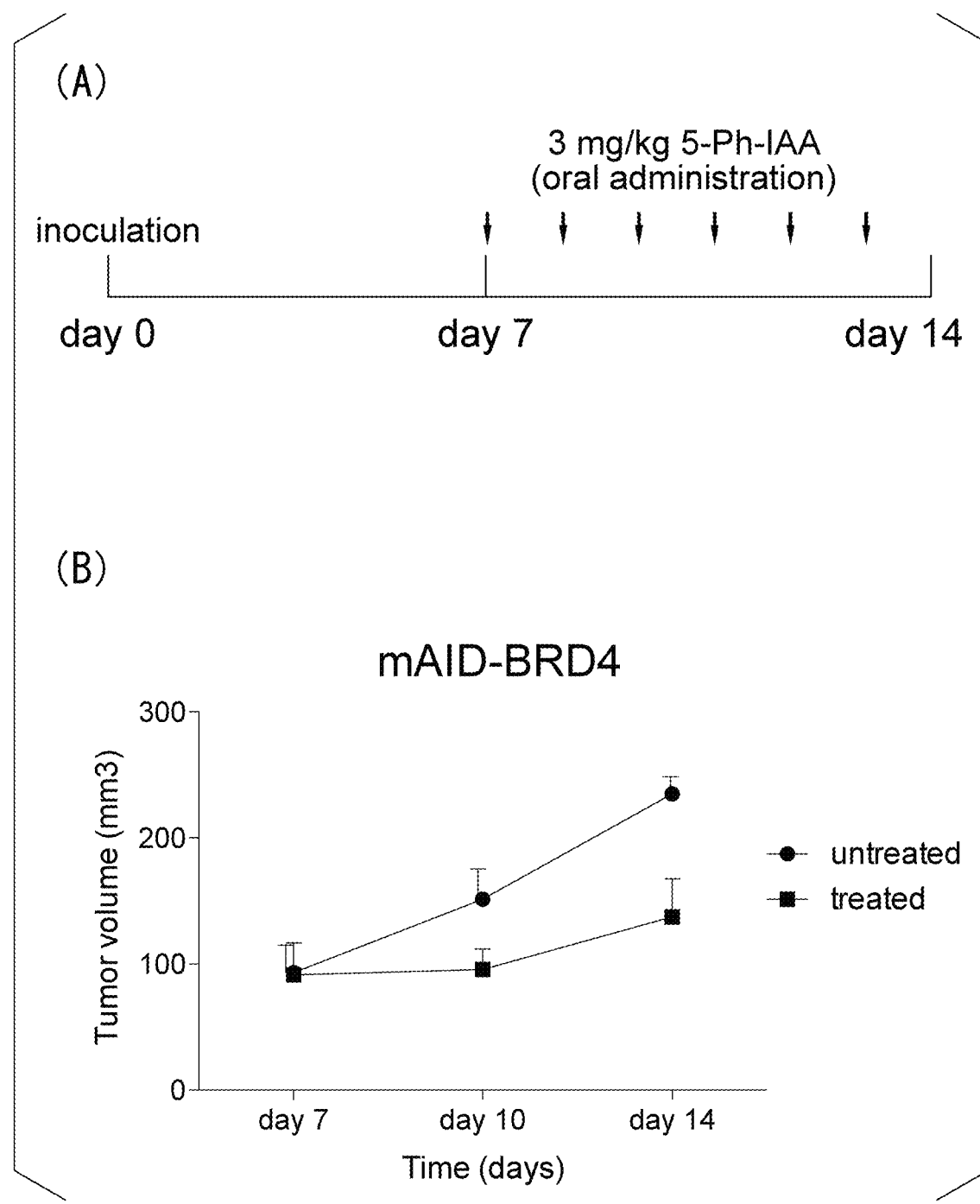
FIG. 13(A) is a diagram showing an oral administration schedule of 5-Ph-IAA and FIG. 13(B) is the results showing tumor growth suppression after administration of 5-Ph-IAA in nude mice in which mAID-BRD4 cells are xenografted.

Furthermore, 3 mg/kg of 5-Ph-IAA was orally administered to nude mice in which mAID-BRD4 cells were xenografted. FIG. 13(A) is a diagram showing an oral administration schedule of 5-Ph-IAA. As shown in FIG. 13(B), significant tumor suppression of mAID-BRD4 xenografts was also observed through oral administration.

Example 6

Figure 11:
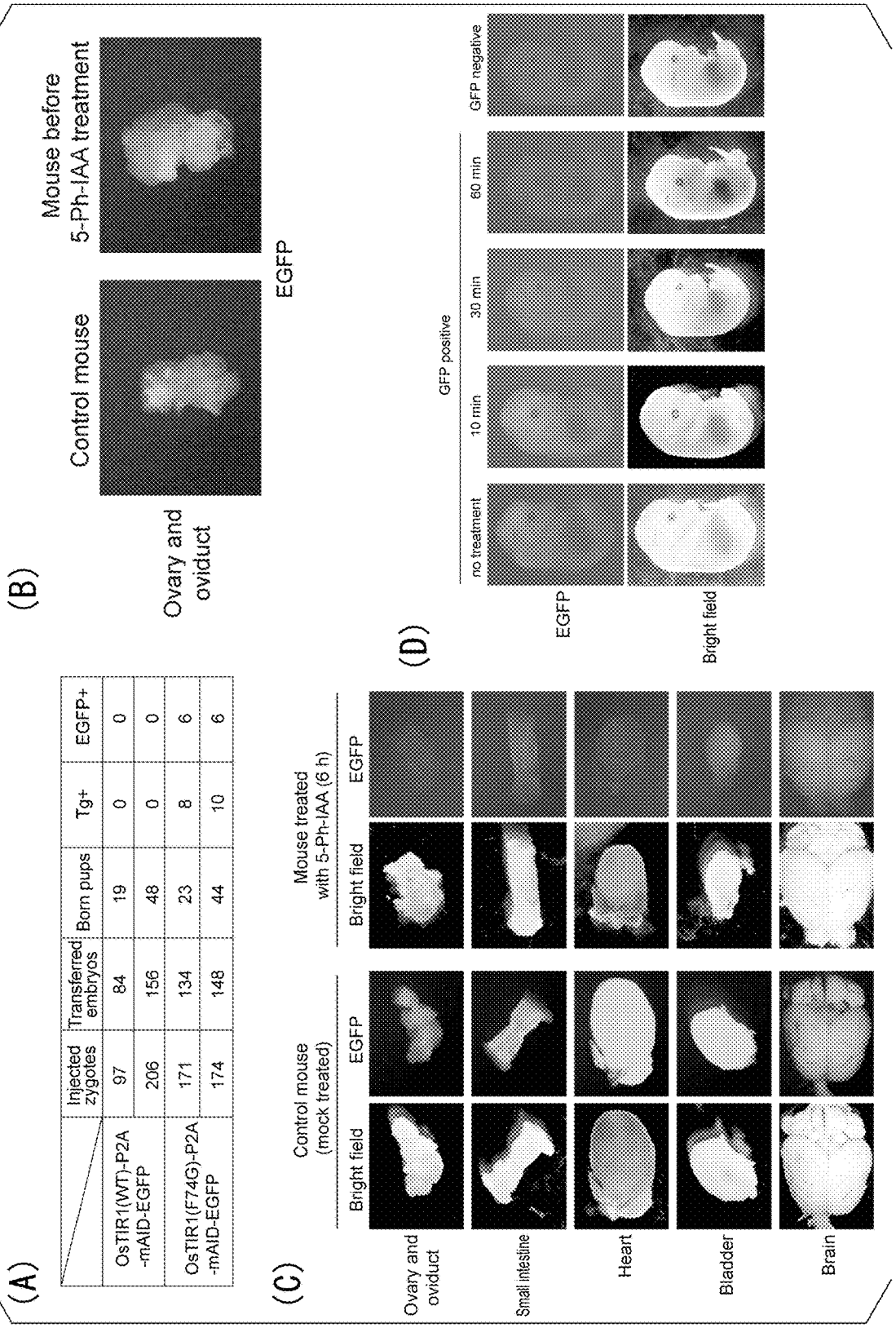
FIG. 11(A) is the result of an attempt to establish a transgenic mouse expressing OsTIR1(WT) or OsTIR1 (F74G) together with a mAID-EGFP reporter.
FIG. 11(B) is a photograph in which the expression of reporters in ovaries and fallopian tubes surgically removed from untreated transgenic mice is confirmed.
FIG. 11(C) is a photograph in which expression of reporters in organs in transgenic mice to which 5-Ph-IAA is intraperitoneally administered is confirmed.
FIG. 11(D) is a photograph in which the disappearance of a reporter expressing in an embryo is confirmed over time.

In order to further confirm whether the AID2 system functioned in a living body of mice, an attempt to establish transgenic mice expressing OsTIR1(WT) or OsTIR1(F74G) together with mAID-EGFP reporters was performed. As shown in FIG. 11(A), OsTIR1(WT) was confirmed to cause embryonic lethality. In contrast, the establishment of a plurality of mouse strains expressing OsTIR1(F74G) and reporters was confirmed (refer to FIG. 11(A).

Two adult female transgenic mice from the same TG strain were used to remove reporters in a plurality of organs.

First, as shown in FIG. 11(B), the expression of reporters in the ovaries and fallopian tubes surgically removed from untreated transgenic mice was confirmed.

Subsequently, pseudo-administration is performed on one mouse and 10 mg/kg 5-ph-IAA was intraperitoneally administered to the other mouse. When the expression of the reporter in the organ was examined 6 hours after administration, it was confirmed that the expression of the reporter was significantly reduced in the ovary, the fallopian tubes, the small intestine, the heart, the bladder, and the brain as compared with the control (refer to FIG. 11(C)). The same data was obtained for adult male mice derived from the same TG strain. These results clearly show that the AID2 system can regulate protein expression in different organs in vivo.

Finally, the expression of the reporter in embryos was examined to confirm a rate of removal of a target protein using the AID2 system in vivo. 5 mg/kg of 5-Ph-IAA was intraperitoneally administered to pregnant females with E13.5 embryos. As shown in FIG. 11(D), a reporter signal disappeared within 1 hour after administration and rapid removal of the reporter in vivo was confirmed.

Example 7

Figure 12:
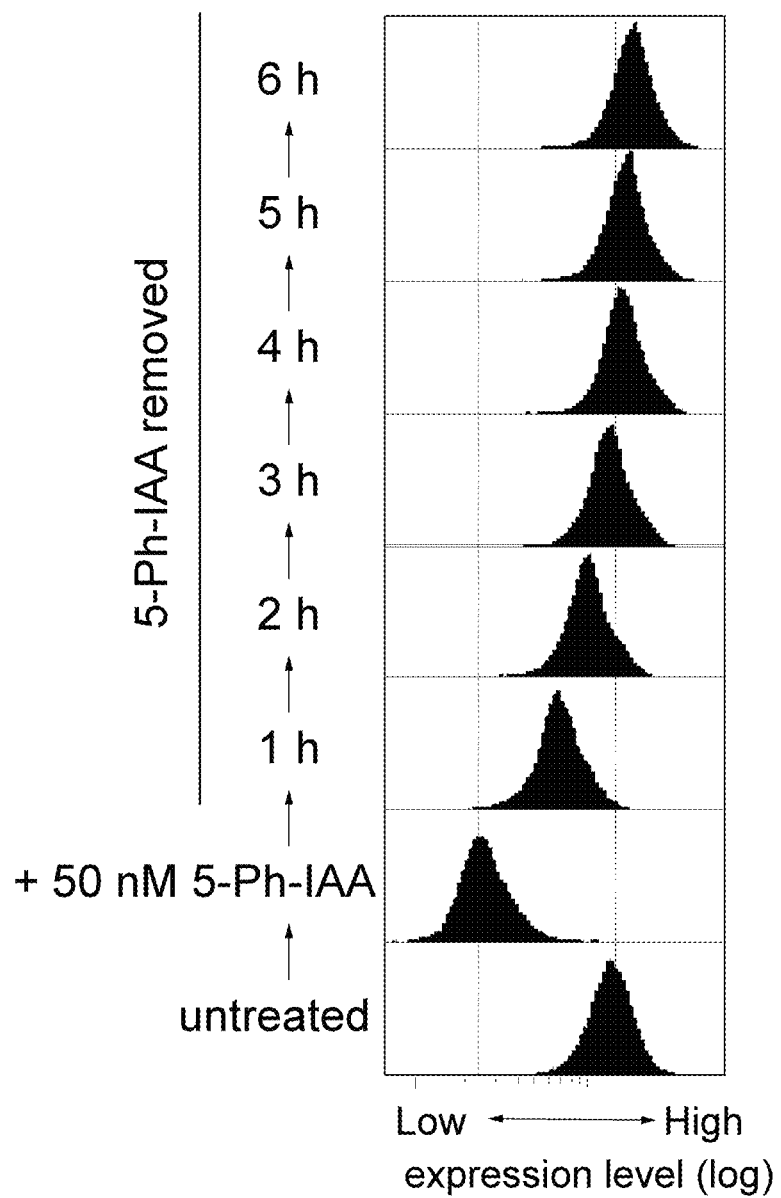
FIG. 12 is the investigation results of the recovery of reporter expression after removal of 5-Ph-IAA in OsTIR1 (F74G) introduced cells.

In order to confirm the reversibility of the AID2 system using a pair of OsTIR1(F74G) and 5-Ph-IAA, 5-Ph-IAA was added to OsTIR1(F74A)/mAID-EGFP-NLS-expressing cells, the degradation of the reporter was induced, the medium was replaced with a medium which did not contain 5-Ph-IAA, and the expression of the reporter was examined. The results were shown in FIG. 12. As shown in FIG. 12, the expression of the reporter was fully restored after 3 hours and the reversibility of the AID2 system was exhibited.

INDUSTRIAL APPLICABILITY

According to the auxin-inducible degron system of the present invention, since it is possible to inhibit auxin-independent target protein degradation, strict and full control of target protein degradation is possible.

SEQUENCE LISTING

PC29848 sequence list.txt

The invention claimed is:

1. A method for evaluating a drug discovery target protein or a drug, comprising:
   administering an auxin analog intraperitoneally or orally in an effective amount of 10 mg/kg or less per day to a genetically modified rodent wherein the genetically modified rodent has an auxin-inducible degron system that controls degradation of a target protein in a living body comprising:
   a chromosome containing a first nucleic acid that encodes a mutant TIR1 family protein having a mutation at an auxin-binding site and having an affinity to an auxin analog,
   a chromosome including a second nucleic acid that encodes a degradation tag containing at least a part of an Aux/IAA family protein and having an affinity to the complex of the mutant TIR1.

2. The method for evaluating a drug discovery target protein or a drug according to claim 1, wherein the genetically modified rodent is a model of a pathological condition.

3. A method for evaluating a drug discovery target protein, comprising:
   Step 1 of administering an auxin analog intraperitoneally or orally in an effective amount of 10 mg/kg or less per day to a genetically modified rodent which has a tissue-specific disease, in which an auxin-inducible degron system controls degradation of a target protein in a living body, and which has cells, throughout the body, containing a chromosome containing a first nucleic acid that encodes a mutant TIR1 family protein having a mutation at an auxin-binding site and having an affinity to the auxin analog, and
   a chromosome containing a second nucleic acid that encodes a degradation tag containing at least a part of an Aux/IAA family protein and having an affinity to a complex of the mutant TIR1 family protein and the auxin analog and a third nucleic acid that encodes a target protein linked upstream or downstream of the second nucleic acid are provided to cells throughout the body thereof, wherein the mutant TIR1 family protein is a protein in which an F74 of OsTIR1 has mutated to A, G, or S,
   wherein the auxin analog is a compound represented by the following general formula (I) or an ester thereof:

[Chem. 2]

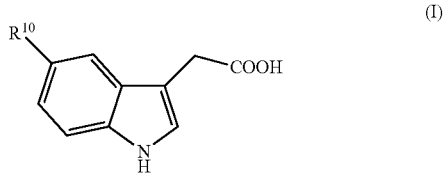

(I)

and wherein $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms;
Step 2 of inducing, by the auxin-inducible degron system, degradation of the target protein in the living body in each cell; and
Step 3 of observing an influence of the degradation of the target protein on diseased tissues and normal tissues.

4. The method for evaluating a drug discovery target protein according to claim 3, further comprising: after Step 3, Step 4 of stopping administration of the auxin analog and Step 5 of observing the influence on the recovery of target protein expression on diseased tissues and normal tissues.

* * * * *